United States Patent
Xu

(10) Patent No.: US 9,553,742 B1
(45) Date of Patent: Jan. 24, 2017

(54) METHOD AND APPARATUS FOR INDEPENDENT RISE AND FALL WAVEFORM SHAPING

(71) Applicant: INPHI CORPORATION, Santa Clara, CA (US)

(72) Inventor: Chao Xu, Thousand Oaks, CA (US)

(73) Assignee: INPHI CORPORATION, Santa Clara, CA (US)

( * ) Notice: Subject to any disclaimer, the term of this patent is extended or adjusted under 35 U.S.C. 154(b) by 0 days.

(21) Appl. No.: 14/855,282

(22) Filed: Sep. 15, 2015

(51) Int. Cl.
*H04K 1/02* (2006.01)
*H04L 25/03* (2006.01)
*H04L 25/49* (2006.01)

(52) U.S. Cl.
CPC ............................ *H04L 25/03828* (2013.01)

(58) Field of Classification Search
CPC .................. H03F 1/3247; H03F 1/3294; H03F 2201/3233; H04L 27/368; H04L 25/03343; H04L 25/14; H04L 25/4925; H04L 5/20; H04L 25/0272; H04L 25/49
USPC .................. 375/219–236, 286–296
See application file for complete search history.

(56) References Cited

U.S. PATENT DOCUMENTS

| | | | | |
|---|---|---|---|---|
| 6,266,379 B1 * | 7/2001 | Dally | ............... | H04L 25/03343 333/28 R |
| 6,281,715 B1 * | 8/2001 | DeClue | .......... | H03K 19/018528 327/108 |
| 6,897,685 B2 * | 5/2005 | Sato | ..................... | H04L 25/0278 326/82 |
| 6,956,407 B2 * | 10/2005 | Baig | ................... | H04L 25/0288 327/141 |
| 7,196,557 B1 * | 3/2007 | Kwasniewski | ..... | H04L 25/0286 326/86 |
| 7,206,337 B2 * | 4/2007 | Tonietto | ........... | G11B 20/10009 375/220 |
| 7,269,212 B1 * | 9/2007 | Chau | ................ | H04L 25/03878 326/80 |
| 7,327,814 B1 * | 2/2008 | Xu | ..................... | H04L 25/03878 375/295 |
| 8,094,047 B2 * | 1/2012 | King | ...................... | H03M 9/00 327/408 |
| 8,233,304 B2 * | 7/2012 | Xu | .......................... | G11C 5/04 365/191 |
| 8,295,336 B2 * | 10/2012 | Lutz | ....................... | H04B 3/141 375/222 |
| 8,311,147 B2 * | 11/2012 | Dally | ................ | H04L 25/03343 375/229 |
| 8,379,701 B2 * | 2/2013 | Lutz | ....................... | H04B 3/141 375/222 |
| 8,379,702 B2 * | 2/2013 | Lutz | .................... | H04L 25/0286 375/222 |
| 8,756,469 B2 * | 6/2014 | Zerbe | ............... | G01R 31/31703 370/242 |
| 8,861,667 B1 * | 10/2014 | Zerbe | .................... | H04L 7/0087 375/229 |
| 9,374,217 B1 * | 6/2016 | Forey | ...................... | H03L 7/00 |

(Continued)

*Primary Examiner* — James M Perez
(74) *Attorney, Agent, or Firm* — Richard T. Ogawa; Ogawa P.C.

(57) ABSTRACT

Embodiments are directed to apparatuses and methods of waveform equalization. More specifically, various embodiments provide independent rise and fall waveform shaping equalization. There are other embodiments as well.

22 Claims, 24 Drawing Sheets

(56) References Cited

U.S. PATENT DOCUMENTS

| | | | |
|---|---|---|---|
| 2005/0134305 A1* | 6/2005 | Stojanovic | H04L 25/028 326/31 |
| 2006/0071688 A1* | 4/2006 | Uenishi | H04L 25/0272 326/82 |
| 2007/0160155 A1* | 7/2007 | Choi | H04L 25/085 375/257 |
| 2008/0231329 A1* | 9/2008 | Lee | G09G 3/3611 327/108 |
| 2010/0020584 A1* | 1/2010 | Xu | G11C 5/04 365/63 |
| 2011/0228823 A1* | 9/2011 | Lutz | H04B 3/141 375/219 |
| 2011/0228824 A1* | 9/2011 | Lutz | H04B 3/141 375/219 |
| 2011/0228871 A1* | 9/2011 | Lutz | H04L 25/0286 375/295 |
| 2012/0045218 A1* | 2/2012 | Sugawara | H04B 10/504 398/182 |
| 2012/0045223 A1* | 2/2012 | Oku | H04B 10/504 398/201 |
| 2012/0194224 A1* | 8/2012 | Moon | H03K 5/1515 327/99 |
| 2012/0235727 A1* | 9/2012 | Oku | H01S 5/0428 327/306 |
| 2012/0242377 A1* | 9/2012 | Yeung | H03F 3/195 327/110 |
| 2013/0003882 A1* | 1/2013 | K.S.V. | H04L 25/0286 375/259 |
| 2013/0034144 A1* | 2/2013 | Doherty | H03G 3/3047 375/232 |
| 2013/0114665 A1* | 5/2013 | Aziz | H04L 25/03057 375/233 |
| 2013/0195165 A1* | 8/2013 | Poulton | H04B 1/04 375/229 |
| 2015/0022253 A1* | 1/2015 | Tsunoda | H03K 5/133 327/231 |
| 2015/0288392 A1* | 10/2015 | Floyd | H04W 16/14 375/130 |
| 2015/0319020 A1* | 11/2015 | Song | H04L 25/03949 345/204 |

\* cited by examiner

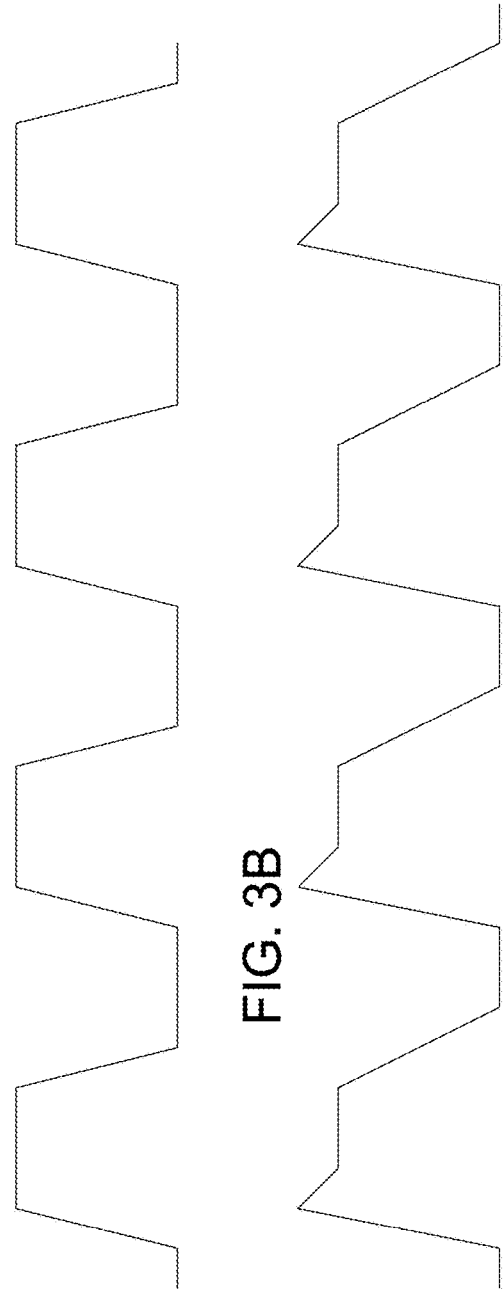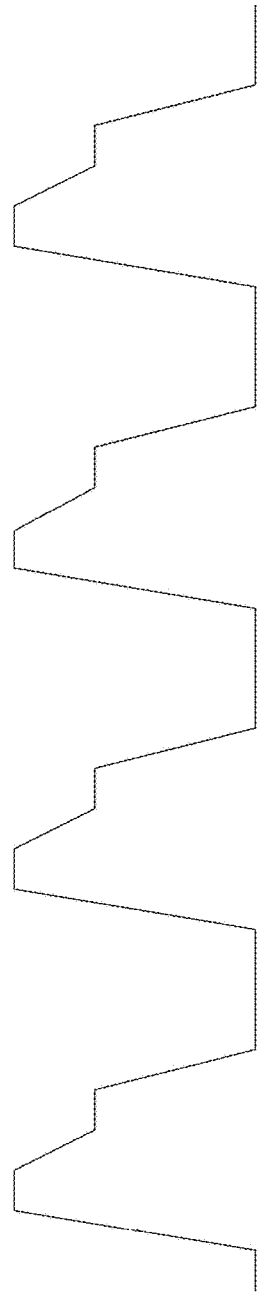

in1, original
input signal in2, inverted delay version
of original signal current
through out

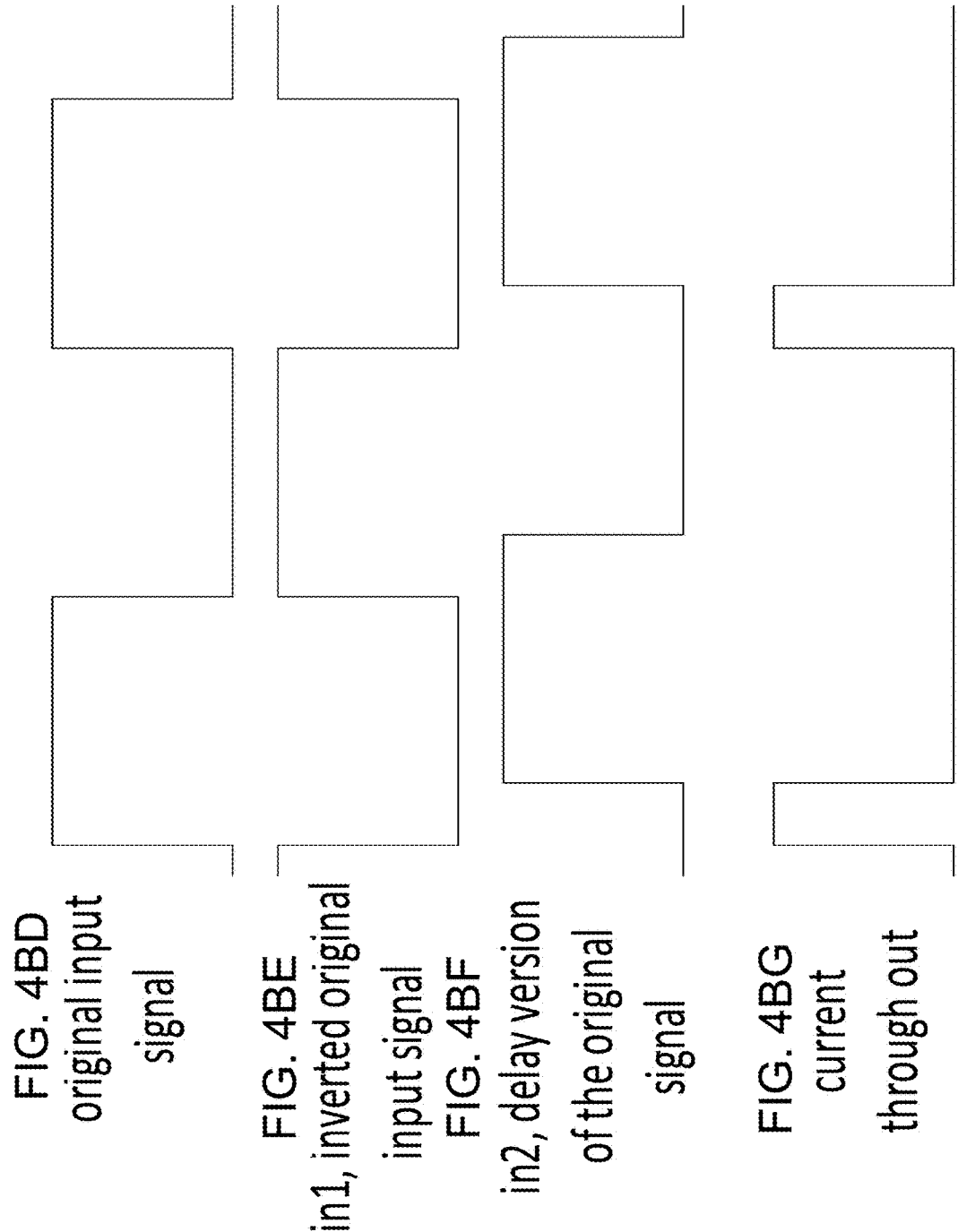

METHOD AND APPARATUS FOR INDEPENDENT RISE AND FALL WAVEFORM SHAPING

BACKGROUND

Embodiments are directed to waveform shaping, and in particular to equalization approaches that independently address waveform rise and fall.

In today's communication applications, the data rates go beyond giga-bits per second. This high-speed data travels through the package, board, and then reach the receiver.

For optical communications, the electrical signals are converted to optic signals through non-linear devices such as laser diodes. However, high-speed signals may be distorted by the non-ideal channels. These can include but are not limited to a package, vias, traces, connectors, laser diodes, and others.

Such distortions can serve to increase the receiver bit error rates. Unaddressed, they can eventually result in the failure of the communication system.

SUMMARY

Embodiments are directed to apparatuses and methods of waveform equalization. More specifically, various embodiments provide independent rise and fall waveform shaping equalization. There are other embodiments as well.

An embodiment of an apparatus comprises a main driver configured to generate a main driver current from an input signal, and a first adjustable delay block configured to generate a first delay signal from the input signal. A rising-edge equalization driver is configured to generate from the delay signal and the input signal, a first corresponding current pulse reflecting a rising edge transition in the input signal. A second adjustable delay block is configured to generate a second delay signal from the input signal, and a falling-edge equalization driver is configured to generate from the delay signal and the input signal, a second corresponding current pulse reflecting a falling edge transition in the input signal. A final driver is configured to combine the main driver current with the first corresponding current pulse and the second corresponding current pulse to generate an output having a waveform adjusted for the rising edge transition or the falling edge transition.

BRIEF DESCRIPTION OF THE DRAWINGS

FIGS. 3A-C show examples of the conversion of electrical signals to optical signals utilizing a Vertical Cavity Surface Emitting Laser (VCSEL) diode.

FIG. 4AA shows an example of a delay cell.

FIG. 4AB shows an embodiment of the multi-phase mixer block of FIG. 4A.

FIGS. 4BA-4BC illustrate operation of the driver of FIG. 4B for falling edge detection.

FIGS. 4BD-4BG illustrate operation of the driver of FIG. 4B for rising edge detection.

DETAILED DESCRIPTION

Embodiments are directed to apparatuses and methods of waveform equalization. More specifically, various embodiments provide independent rise and fall waveform shaping equalization. There are other embodiments as well.

Figure 1:
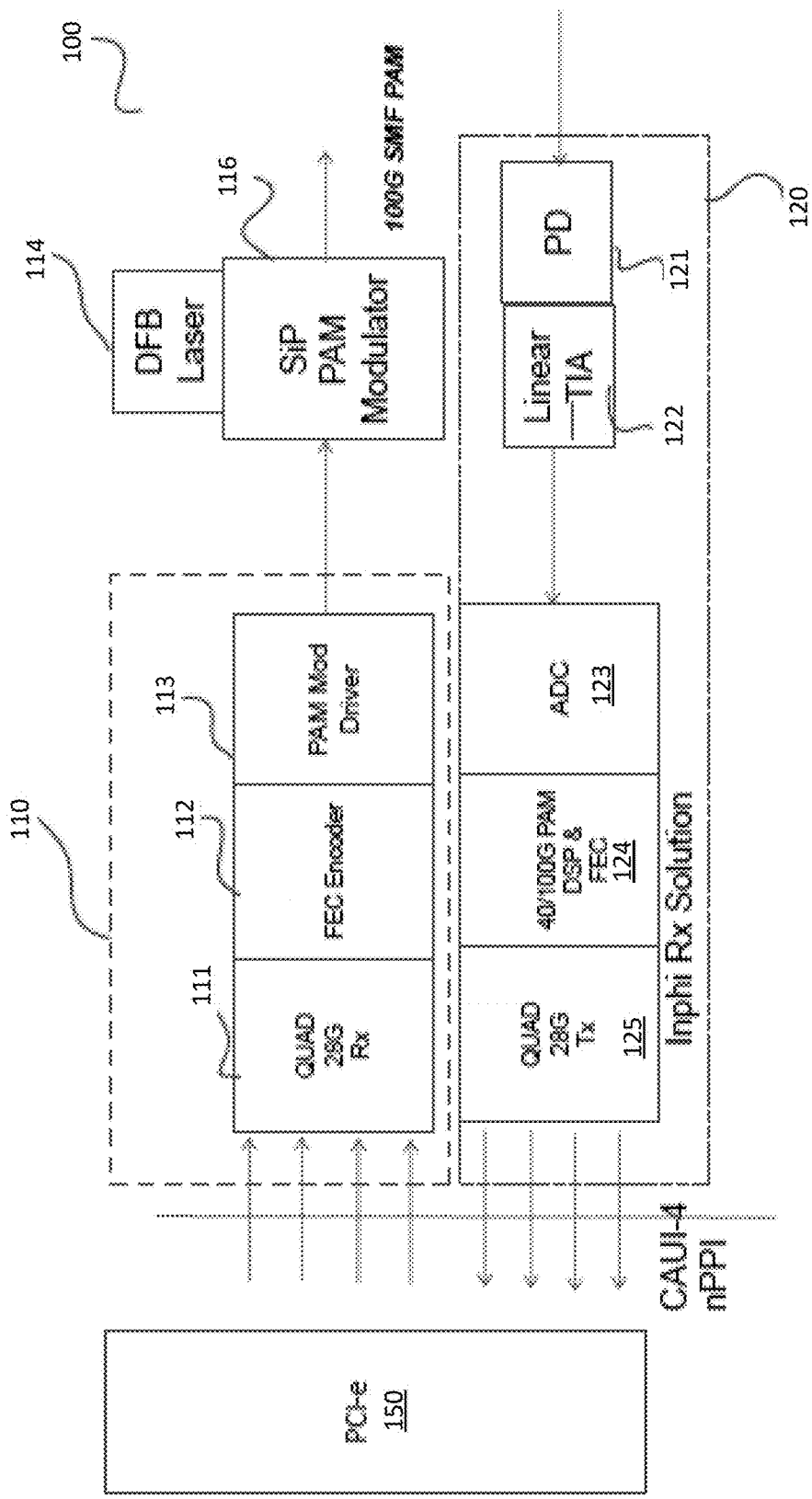
FIG. 1 shows an optical communications interface.

FIG. 1 is a simplified diagram illustrating a communication interface 100 according to an embodiment. This diagram is merely an example, which should not unduly limit the scope of the claims. One of ordinary skill in the art would recognize many variations, alternatives, and modifications. The communication interface 100 includes transmitter module 110 and a receiver module 120. The transmitter module 110 comprises a receiver 111, encoder 112, and PAM modulation driver 113.

In an embodiment, the communication interface 100 is configured to receive incoming data at through four channels, where each channel is configured at 25 gigabits/s and configured as a PAM-2 format. Using the transmitter module 110, modulator 116, and the laser 114, the communication interface 100 processes data received at 25 gigabits/s from each of the four incoming channels, and transmits PAM modulated optical data stream at a bandwidth of 100 gigabits/s. It is to be appreciated that other bandwidths are possible as well, such as 40 Gbps, 400 Gbps, and/or others.

As shown the transmitter module 110 receives 4 channels of data. It is to be appreciated that other variants of pulse-amplitude modulation (e.g., PAM4, PAM8, PAM12, PAM16, etc.), in addition to PAM-2 format, may be used as well. The transmitter module 110 comprises functional block 111, which includes a clock data recovery (CDR) circuit configured to receive the incoming data from the four communication channels. In various embodiments, the functional block 111 further comprises multiplexer for combining 4 channels for data. For example, data from the 4 channels as shown are from the PCE-e interface 150. For example, the interface 150 is connected to one or more processors. In a specific embodiment, two 2:1 multiplexers are employed in the functional block 111. For example, the data received from the four channels are high-speed data streams that are not accompanied by clock signals. The receiver 111 comprises, among other things, a clock signal that is associated with a predetermined frequency reference value. In various embodiments, the receiver 111 is configured to utilize a phase-locked loop (PLL) to align the received data.

The transmitter module 110 further comprises an encoder 112. As shown in FIG. 1, the encoder 112 comprises a forward error correction (FEC) encoder. Among other things, the encoder 112 provides error detection and/or correction as needed. For example, the data received is in a PAM-2 format as described above. The received data comprises redundancy (e.g., one or more redundant bits) helps the encoder 112 to detect errors. In a specific embodiment, low-density parity check (LDPC) codes are used. The encoder 112 is configured to encode data received from four channels as shown to generate a data stream that can be transmitted through optical communication link at a bandwidth 100 gigabits/s (e.g., combining 4 channels of 25 gigabits/s data). For example, each received is in the PAM-2 format, and the encoded data stream is a combination of four data channels and is in PAM-8 format. Data encoding and error correction are used under PAM format. The PAM formats as used in the embodiments of the present invention are further described below.

The PAM modulation driver 113 is configured to drive data stream encoded by the encoder 112. In various embodiments, the receiver 111, encoder 112, and the modulation driver 113 are integrated and part of the transmitter module 110.

The PAM modulator 116 is configured to modulate signals from the transmitter module 110, and convert the received electrical signal to optical signal using the laser 114. For example, the modulator 116 generates optical signals at a transmission rate of 100 gigabits per second. It is to be appreciated that other rate are possible as well, such as 40 Gbps, 400 Gbps, or others. The optical signals are transmitted in a PAM format (e.g., PAM-8 format, PAM12, PAM 16, etc.). In various embodiments, the laser 114 comprises a distributed feedback (DFB) laser. Depending on the application, other types of laser technology may be used as well, as such vertical cavity surface emitting laser (VCSEL) and others.

This particular communication interface 100 is configured for both receiving and transmitting signals. A receiver module 120 comprise a photo detector 121 that converts incoming data signal in an optical format converts the optical signal to an electrical signal. In various embodiments, the photo detector 121 comprises indium gallium arsenide material. For example, the photo detector 121 can be a semiconductor-based photodiode, such as p-n photodiodes, p-i-n photodiodes, avalanche photodiodes, or others. The photo detector 121 is coupled with an amplifier 122. In various embodiments, the amplifier comprises a linear transimpedance amplifier (TIA). It is to be appreciated by using TIA, long-range multi-mode (LRM) at high bandwidth (e.g., 100 Gb/s or even larger) can be supposed. For example, the TIA helps compensate for optical dispersion in electrical domain using electrical dispersion compensation (EDC). In certain embodiments, the amplifier 122 also includes a limiting amplifier. The amplifier 122 is used to produce a signal in the electrical domain from the incoming optical signal. In certain embodiments, further signal processing such as clock recovery from data (CDR) performed by a phase-locked loop may also be applied before the data is passed on.

The amplified data signal from the amplifier 122 is processed by the analog to digital converter (ADC) 123. In a specific embodiment, the ADC 123 can be a baud rate ADC. For example, the ADC is configured to convert the amplified signal into a digital signal formatted into a 100 gigabit per second signal in a PAM format. The functional block 124 is configured to process the 100 Gb/s data stream and encode it into four at streams at 25 Gb/s each. For example, the incoming optical data stream received by the photo detector 121 is in PAM-8 format at a bandwidth of 100 Gb/s, and at block 124 four data streams in PAM-2 format is generated at a bandwidth of 25 Gb/s. The four data streams are transmitted by the transmitter 125 over 4 communication channels at 25 Gb/s.

It is to be appreciated that there can be many variations to the embodiments described in FIG. 1. For example, different number of channels (e.g., 4, 8, 16, etc.) and different bandwidth (e.g., 10 Gb/s, 40 Gb/s, 100 Gb/s, 400 Gb/s, 3.2 Tb/s, etc.) can be used as well, depending on the application (e.g., server, leaf switch, spine switch, etc.).

In operation, the communication interface 100 sends optical signal to another communication interface. More specifically, the transmitter module of one network interface sends signals over optical network to the receiver module of another network interface. More specifically, electrical signals are modulated and converted to optical signals.

Figure 1A:
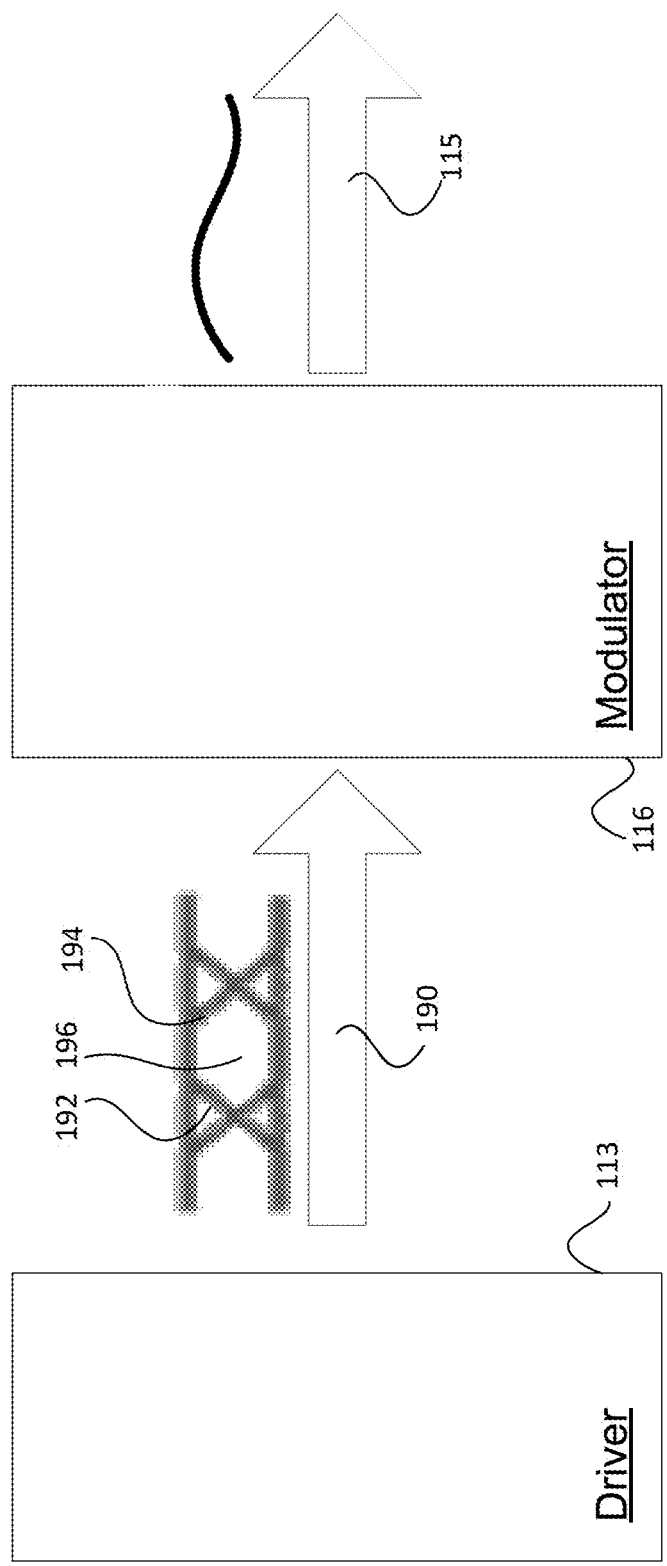
FIG. 1A shows an enlarged view of the driver and modulator of FIG. 1.

FIG. 1A shows an enlarged view of the driver and modulator of FIG. 1. The PAM modulation driver 113 sends PAM modulated electrical signals to the PAM modulator 116. That PAM modulator, together with the laser source 114, sends modulated optical signals 115 out. It is to be appreciated that modulated optical signals according to embodiments may be modulated both in amplitude and phase.

As previously mentioned, high-speed electrical signals may become distorted by the non-ideal characteristics of signal channels. This can in turn affect the quality of the optical signals produced therefrom.

For example, as shown in FIG. 1A the electrical signals 190 do not exhibit vertical rising and falling edges with time. Instead, those signals exhibit sloped rising edges 192 and sloped falling edges 194. Taken together, these edges form an eye diagram 196.

Signal distortions can arise from the operation of various phenomena, including but not limited to temperature, voltage amplitude, grounding schemes, termination schemes, signal routing, transmission-line effects, and impedance mismatches. In order to reduce such distortions, equalization(s) may applied to the signals either in the transmitter or in the receiver to compensate the channel and make the overall system as an all-pass system.

Some equalization techniques use a linear finite impulse response (FIR) filter to generate symbols to compensate the distortions caused by the limited channel bandwidth. For example, the FIG. 2 shows the symbol is generated by linear combination of the current bit and the delayed version of the current bit.

Figure 2:
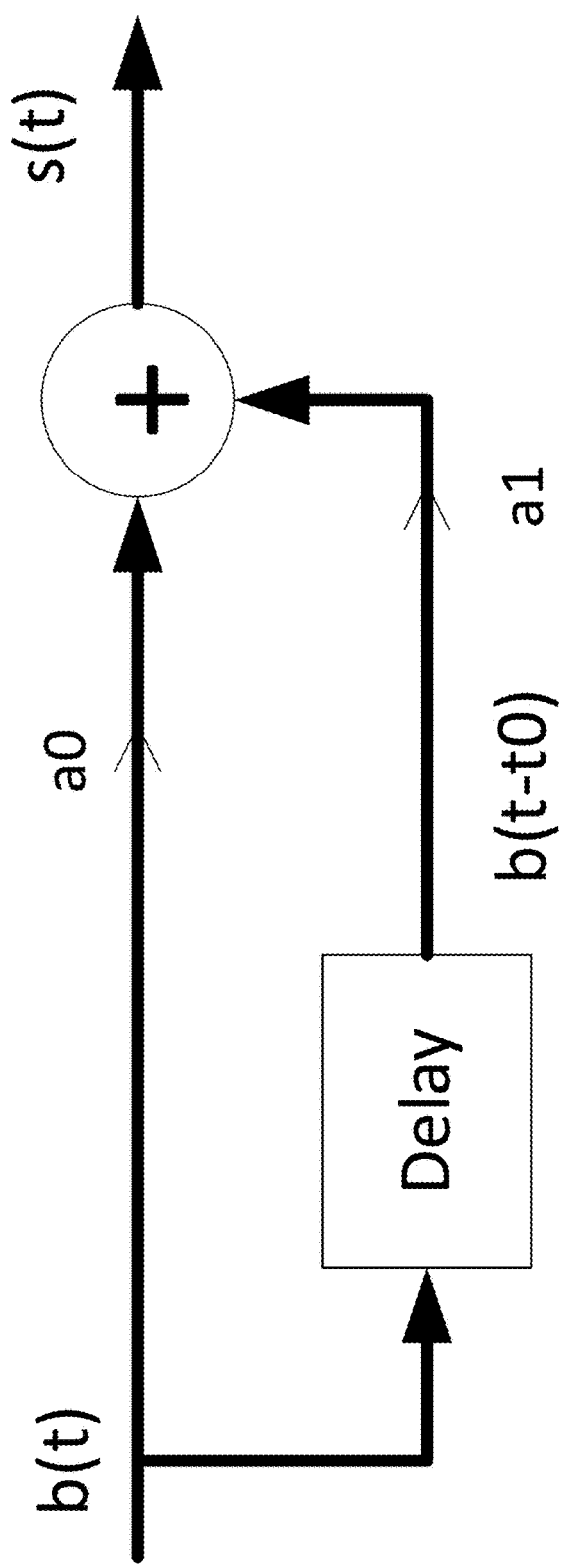
FIG. 2 is a simplified view showing 2-tap Finite Impulse Response (FIR) equalization.
Figure 3:
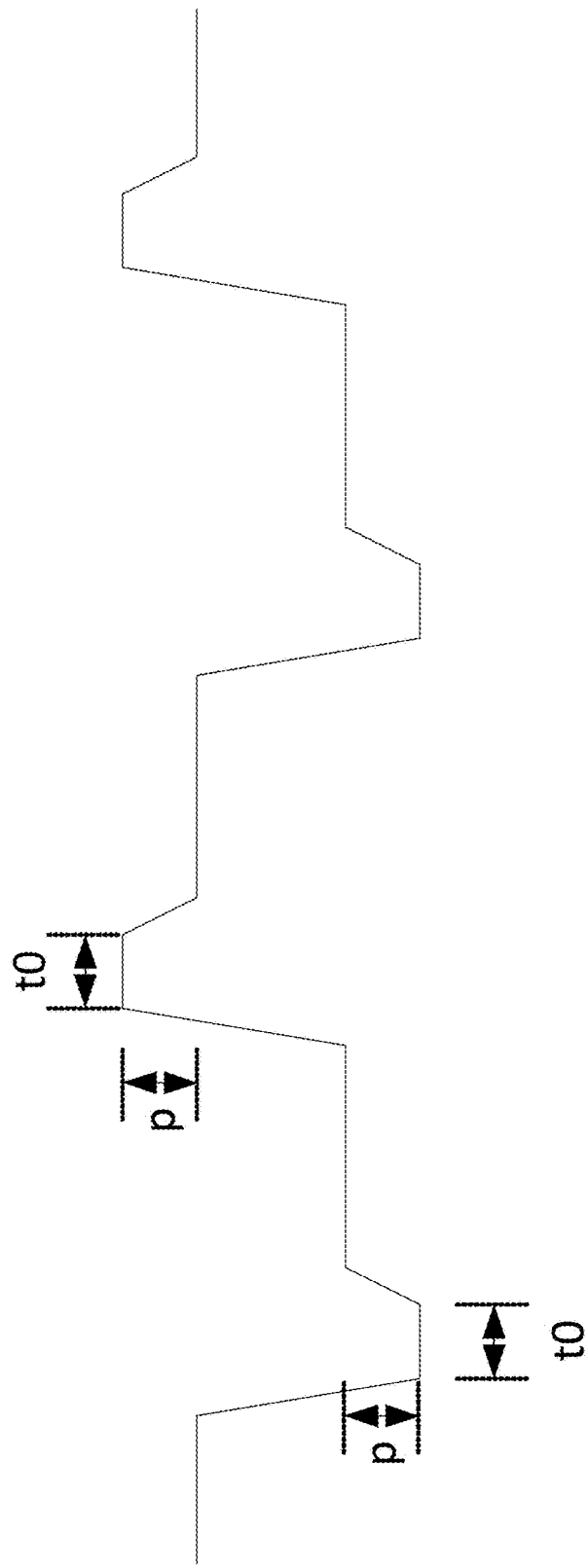
FIG. 3 shows a pre-distorted symbol generated by the system of FIG. 2.

The equalization approach of FIG. 2 generates the pre-distortions to the current signals and thereby compensates the channel loss. For example, the equalization approach of FIG. 2 generates the signals shown in FIG. 3, where t0 is the delay and p is the edge peaking generated by the FIR filter.

The waveforms are pre-distorted and exhibit a peaking whenever there are transitions. However, this peaking is the same with the rising edges and falling edges, i.e., symmetry is displayed.

Equalization approaches utilizing FIR filters are useful in systems such as board traces, that exhibit symmetry. In other environments, however, the distortions are asymmetrical with respect to the waveforms (e.g., their rising and falling edges).

For example, in an optical communication system, electrical signals are converted to optical signals through laser diodes. Such laser diodes are non-linear devices, and they introduce asymmetric distortions to the optical signals.

FIGS. 3A-3C show examples of the conversion of electrical signals to optical signals utilizing a Vertical Cavity Surface Emitting Laser (VCSEL) diode. Specifically, FIG. 3A shows the electrical signal.

FIG. 3B shows the optical signal. The waveform of FIG. 3B depicts the VCSEL as slowing the electrical falling edge as compared with the rising edge. This is caused by the VCSEL off-state bounce.

FIG. 3C shows optical signal following symmetry equalization. Here, the waveform of FIG. 3C shows that application of a symmetry filter to both rising edges and falling edges does not sufficiently compensate for the distortions.

Rather, this approach distorts the rising edge signals, and renders rising edge peaking even more pronounced.

Accordingly, embodiments are directed to the implementing independent rise and fall waveform shaping equalization. Such techniques can compensate for asymmetry distortions caused by the channels.

In particular, specific embodiments interdependently control the rising edge and falling edge of the waveforms, and create the asymmetry or symmetry distortions to compensate the distortions in the signal paths. In addition, a control circuit can increase or decrease the amplitude, and/or increase or decrease the slew rate when the corresponding edge comes. The duration of the control period can also be adjustable in certain embodiments.

Figure 4:
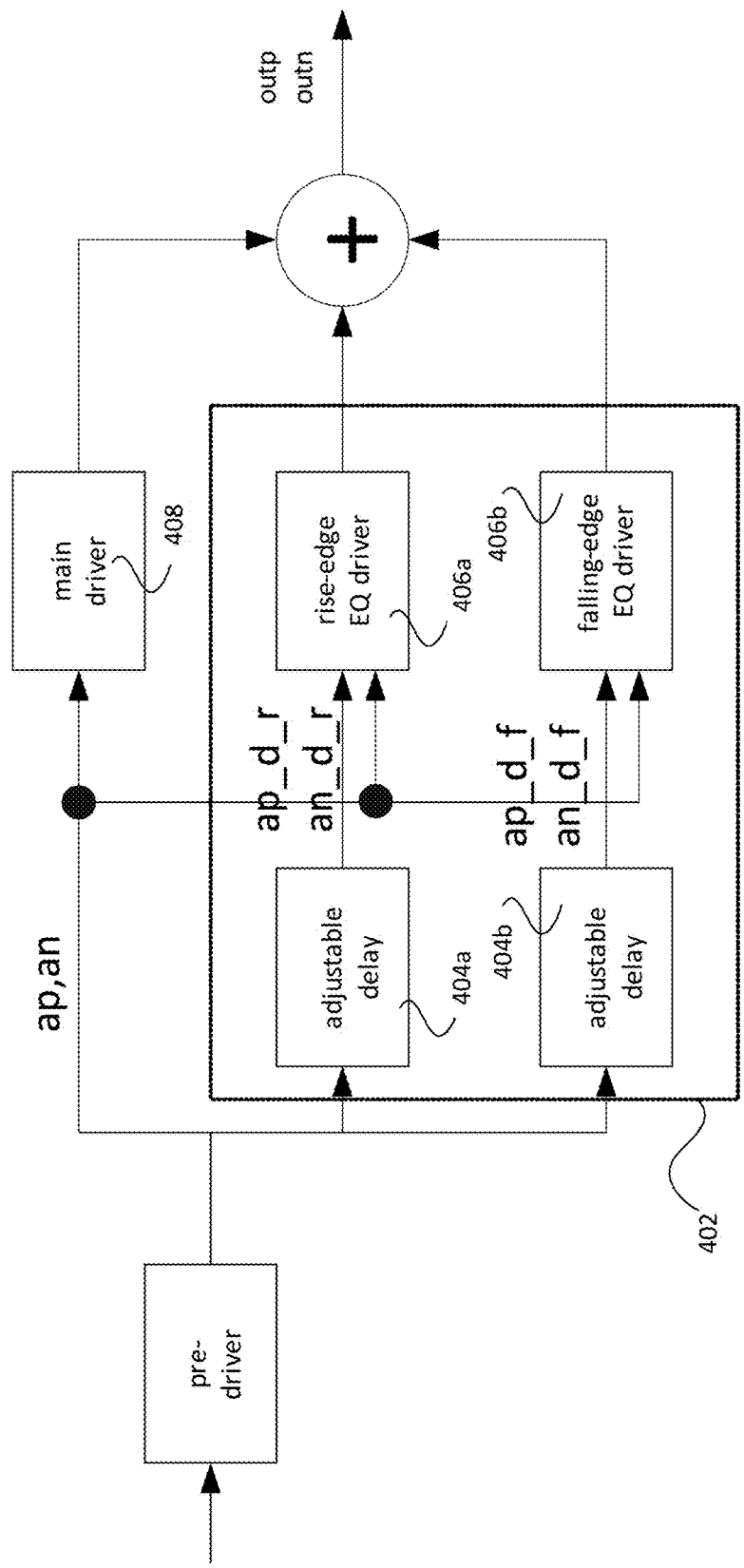
FIG. 4 is a simplified block diagram showing independent rise and fall waveform shaping according to an embodiment.

FIG. 4 is a simplified block diagram illustrating a specific embodiment 400. The independent rise and fall waveform shaping is shown in the dashed rectangle 402.

That rectangle includes two adjustable delay blocks 404a, 404b, and two equalization drivers 406a, 406b. One of each is for rising edges, and the other is for falling edges.

First, the input signals ap,an feed to the main driver 408 and the two adjustable delay blocks. The adjustable delay blocks generate delay versions of input signals:
ap_d_r, an_d_r (for rising edges); and
ap_d_f, an_d_f (for falling edges).

Then, the rise-edge equalization driver takes inputs from ap, an and the delay versions signals ap_d_r, an_d_r, and generates the corresponding current pulses when there are rising transitions. The generated current pulses sum or subtract with the main driver current to adjust the waveform for the rising edges.

The current pulse duration is controlled by the adjustable delay blocks.

The same mechanism is applied to the falling edge waveform shaping. That is, the falling-edge equalization driver takes inputs from ap, an and the delay versions signals ap_d_f, an_d_f, and generates the corresponding current pulses when there are falling transitions. The generated current pulses sum or subtract with the main driver current to adjust the waveform for the falling edges.

Embodiments can implement this approach to generate narrow current pulses without introducing voltage headroom and switch noise issues. Specifically, in order to eliminate the narrow pulse in the signal path, current pulses are generated at the final driver stage.

Thus, the signals inside the chip are still the same rate with the input signals. For example, even if it is desired to generate 30 ps current pulse out of 10 Gbps data, internal signals (e.g., ap, an, ap_d_r, an_d_r, ap_d_f, an_d_f), still have 10 Gbps instead of 30 ps pulses.

A challenge is to avoid stacking transistors in the final driver stage, because of large signal swing of the outputs and voltage headroom loss.

In order to generate edge-awareness pulses, some types of "AND" functions are implemented without stacking transistors.

Figure 4A:
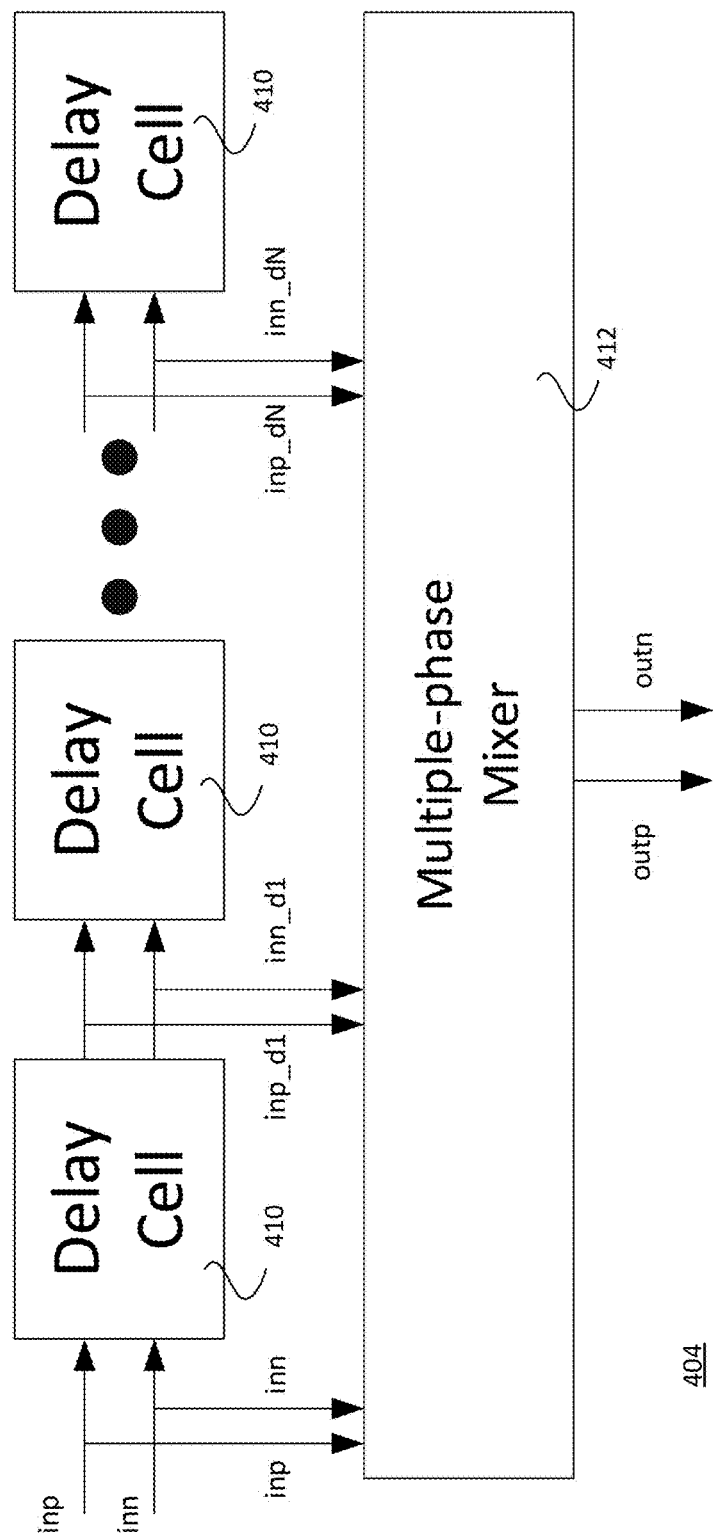
FIG. 4A shows an adjustable delay block of the embodiment of FIG. 4.
Figure 4A:
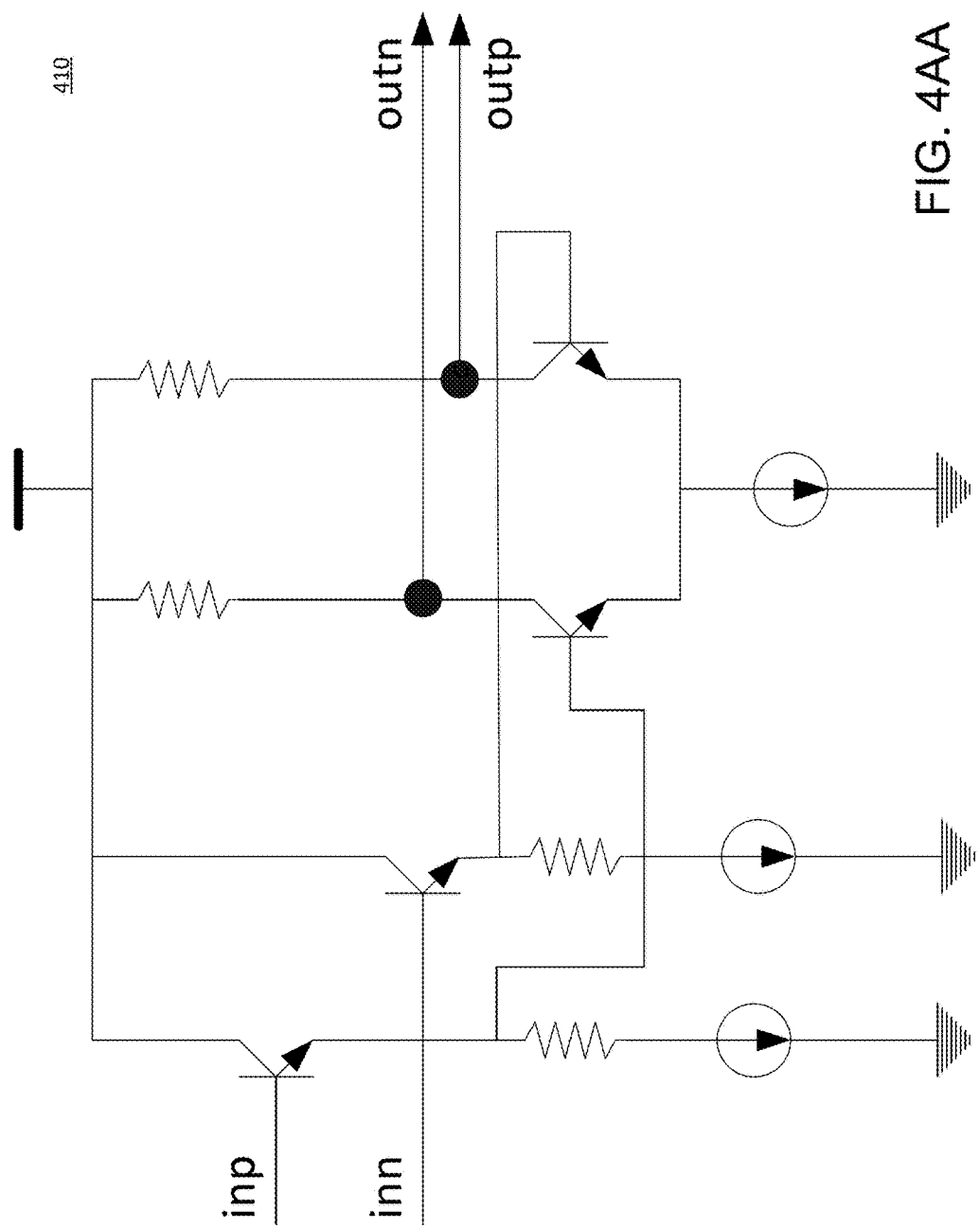
Figure 4A:
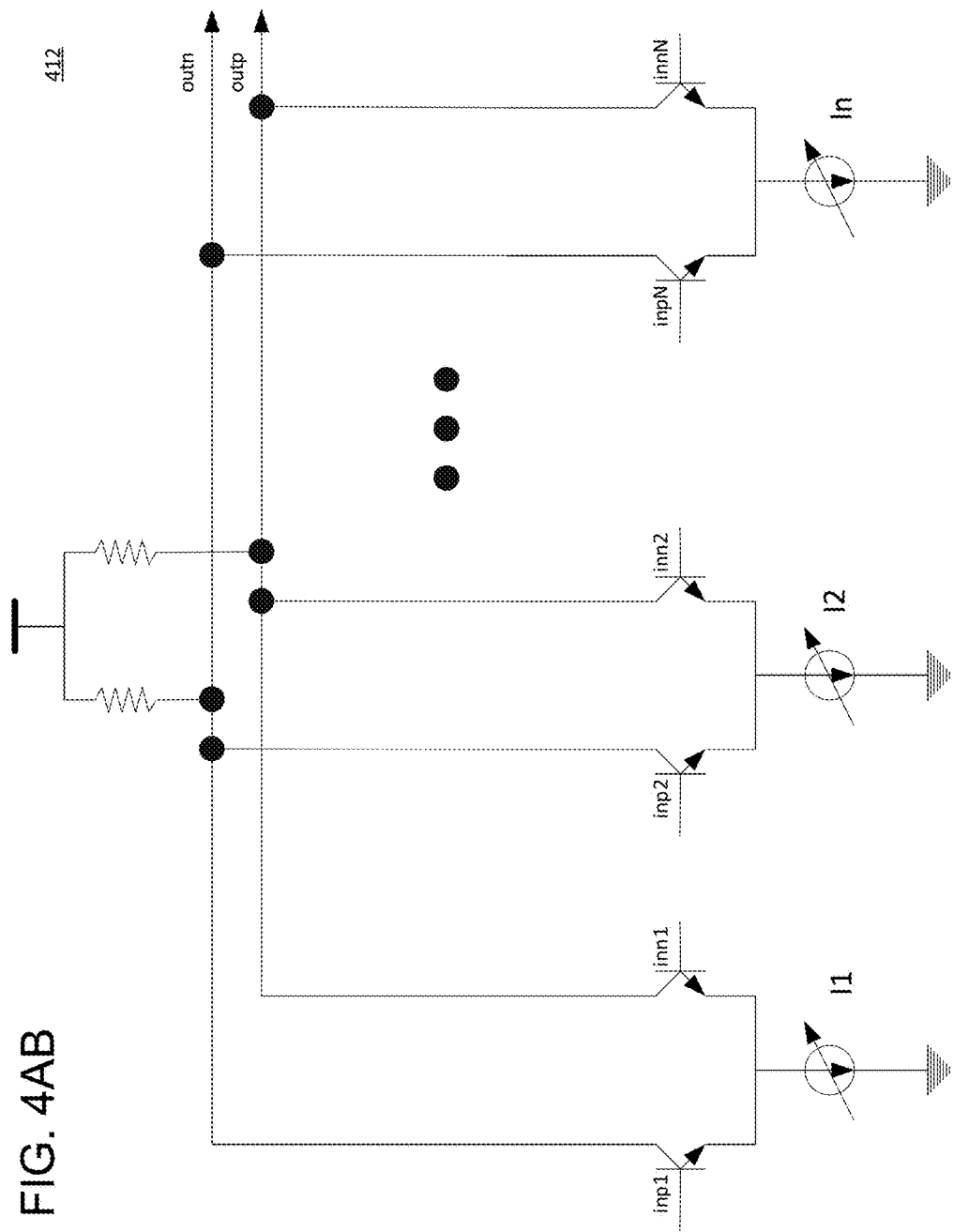

An adjustable delay block 404 of the embodiment of FIG. 4, is shown in FIG. 4A. The adjustable delay block includes multiple delay cells 410 and one multiple-phase mixer 412.

The input signals inp, inn, input to the delay cell chain. They generate multiple delay versions of signals: inp_d1, inn_d1, . . . , inp_dN, inn_dN.

Then, these delay version signals and the input signals, input to the multiple-phase mixer to generate the final outputs: outp, outn.

The delay cell can be simple buffer in current mode logic (CML), CMOS, or emitter-couple logic (ECL). This delay cell can be regulated in a loop (delay-locked loop DLL or phase-locked loop PLL) to make the delay of each cell process, voltage, and temperature independent.

An example of delay cell 410 is shown in FIG. 4AA. This example is implemented as emitter-coupled logic (ECL). The inputs inp, inn, go through source followers and input to a ECL buffer.

FIG. 4AB shows an embodiment of the multi-phase mixer block 412 of FIG. 4A. There are N differential pairs sharing the common resistor loads.

The tail current sources I1, I2, . . . , In, are adjustable based on the delay settings. The inputs to each differential pair are from the outputs of the delay cells in the delay chain.

For example, if the delay setting is one third of the one delay cell delay, then only the first two differential pairs tail currents are on, and all other tail currents are 0. The first differential pair tail current is twice of the second differential pair tail current.

In this manner, the edges of the outputs of the mixer will be blended with the edges of the first differential pairs inputs. Since the first differential pair tail current is twice of the second differential pair, the output edges are closer to the first differential inputs edges.

By combining the delay cell chain and the multiple-phase mixer, fine resolution of the delay can be achieved.

Figure 4B:
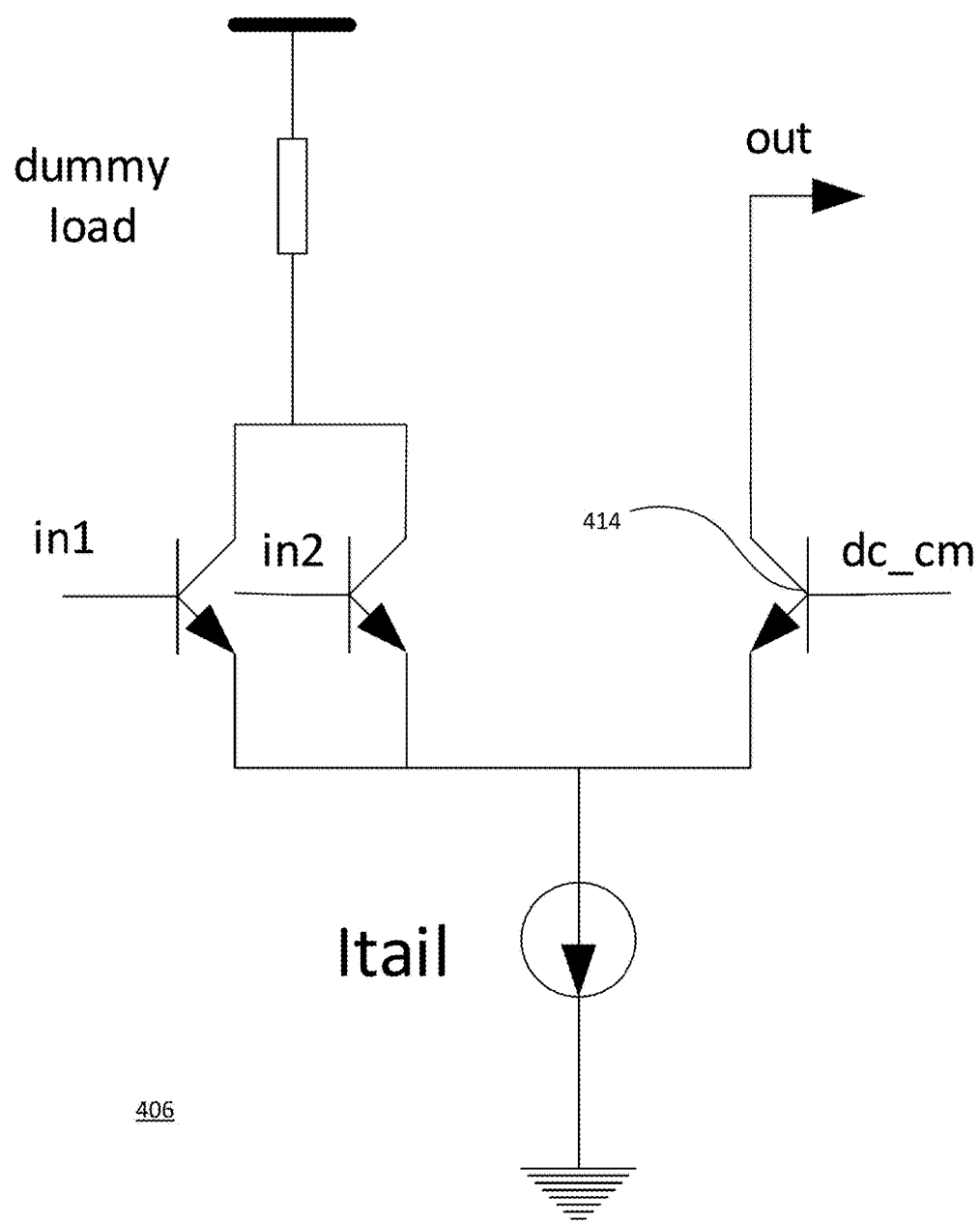
FIG. 4B shows details of the edge aware equalization driver block.
Figure 4B:
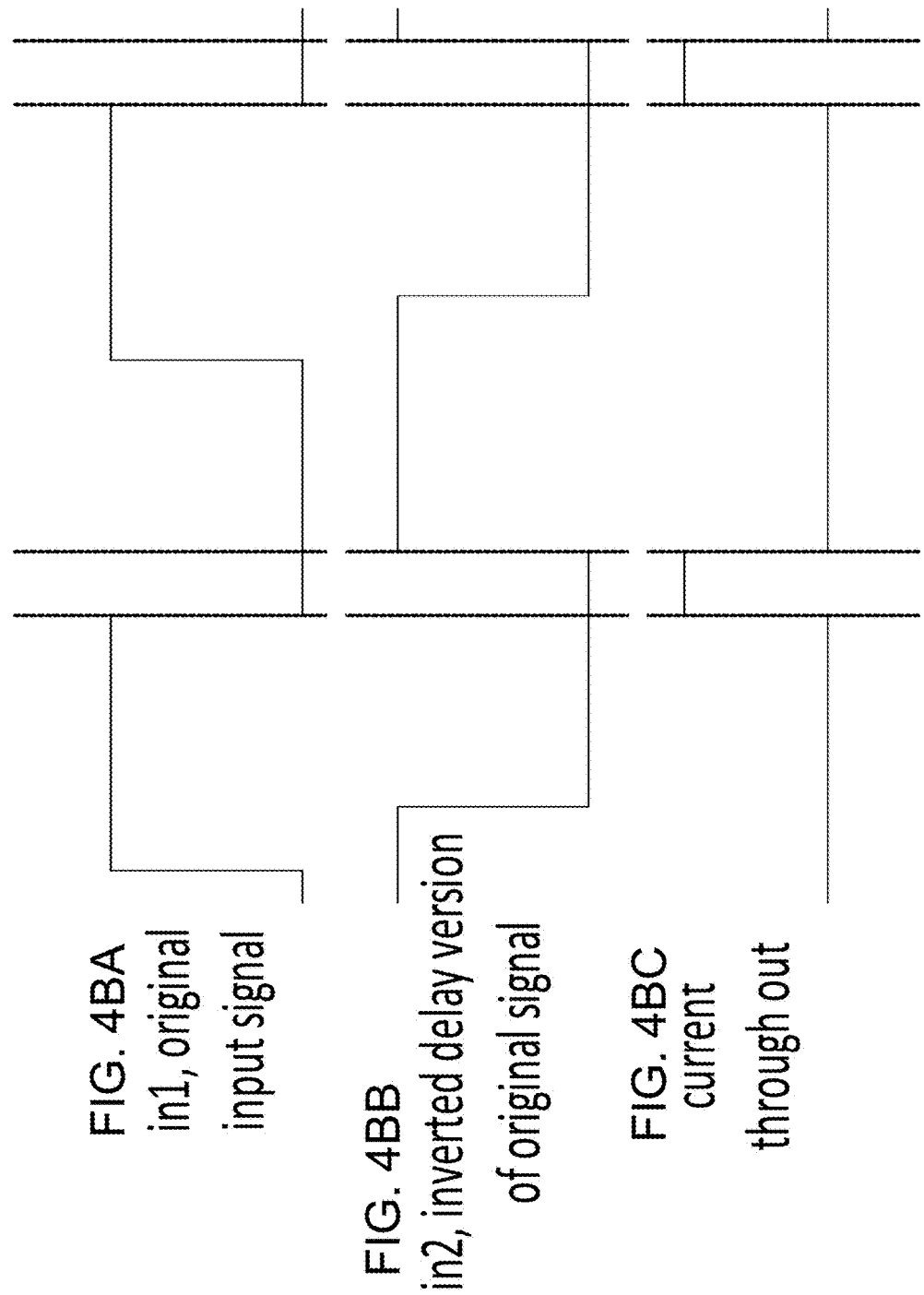

Returning to FIG. 4, the edge aware equalization driver block 406 is shown in detail in FIG. 4B. Here, a challenge is to generate the narrow pulse when the corresponding edge is detected.

Normally it can be implemented as a simple "AND" function. But, for the very high-speed data rate, the output of the "AND" logic can only have around 20 ps pulse width.

Given the difficulty of propagating this narrow pulse even for one stage further, rather than generating an internal narrow voltage pulse, the narrow current pulse is generated at the final driver stage instead. In this way, a narrow voltage pulse is generated in the chip.

Voltage headroom can present another challenge to implanting "AND" logic at the final driver stage. Usually, "AND" logic stacks at least two transistors together to generate the output.

However, by stacking the transistor the voltage headroom for the tail current transistor is lost. This especially impacts the final driver stage, because usually the swing at the final driver is bigger and more voltage headroom is lost.

So in the implementation of FIG. 4B, rather than stacking two transistors, only one transistor 414 is used. The base is biased at the DC voltage instead of signal itself. This DC voltage is the common mode voltage (dc_cm) of the signal in1 or in2. The bias circuit is used to ensure the in1 and in2 have the same common mode voltage.

FIGS. 4BA-4BC illustrate operation of the driver of FIG. 4B for falling edge detection. There are two input signals: in1 and in2.

Depending on the waveform edge (rising, falling) sought to be detected, two input signals are different. For the falling edge detector, in1 is the original input signal (FIG. 4BA) and in2 (FIG. 4BB) is the inverted delay version of the original input signal.

The waveform is shown in FIG. 4BC. There is a current pulse generated at every falling edge of the original input signal.

A similar approach is used for the rising edge current pulse generation, as shown in FIGS. 4BD-4BG. Here, in1 (FIG. 4BD) is the inverted original signal (FIG. 4BE), and in2 (FIG. 4BF) is the delay version of the original signal.

FIG. 4BG shows that there is a current pulse generated at every rising edge of the original input signal.

A last stage is to combine the current pulses with the final main driver, and shape the rise and fall waveform independently. The final driver 500 with independent rise and fall waveform shaping equalization is shown in FIG. 5.

Specifically, four edge-aware equalization blocks 502, 504, 506, 508 are shown connected with the final driver, and share the common load. Each edge-aware equalization block generates one pulse-width adjustable current pulse to the output load based on the edge of the waveform.

Figure 5:
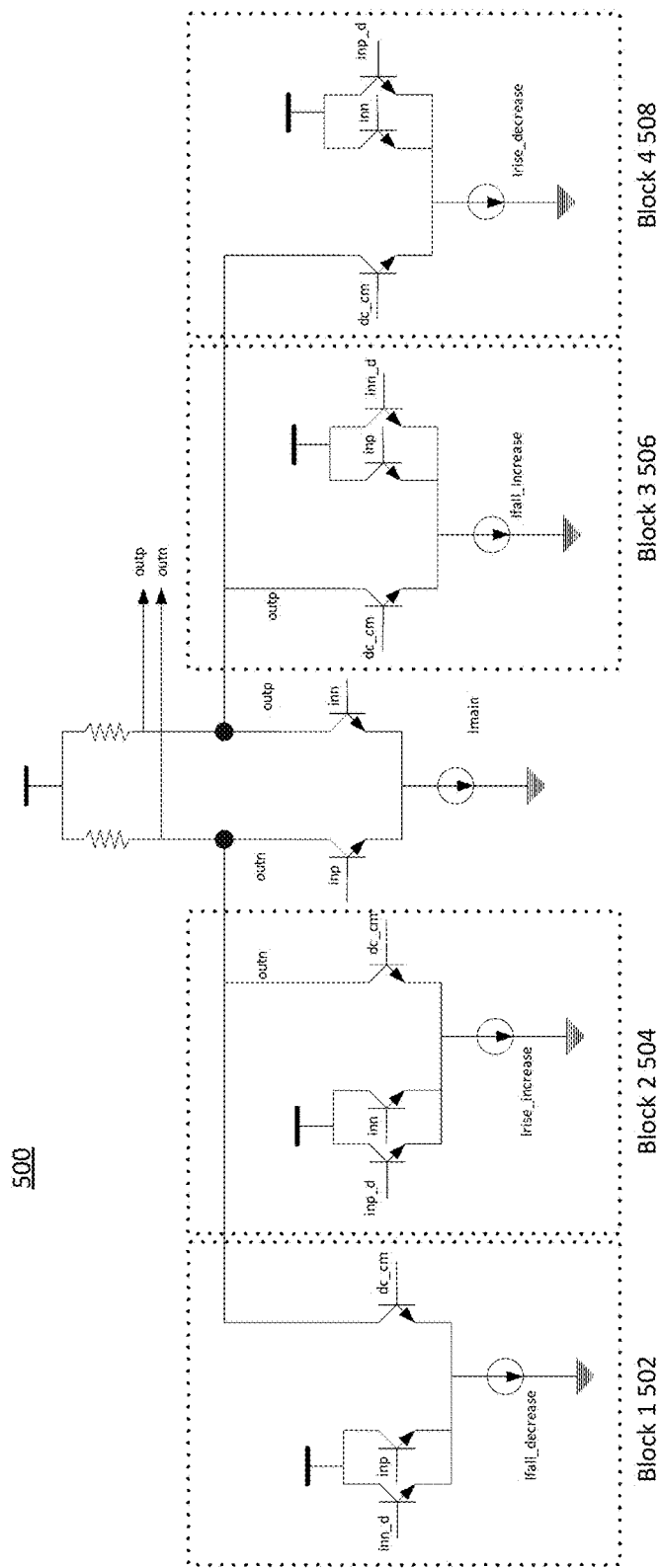
FIG. 5 shows a final driver according to an embodiment.

For example, in FIG. 5, Block 1 will generate a negative current pulse when there is a falling edge, and reduce the current through the external load. The Block 2 will generate a positive current pulse when there is a rising edge and increase the current through the external load.

The Block 3 will generate a positive current pulse when there is a falling edge and increase the current through the external load. The Block 4 will generate a negative current pulse when there is a rising edge and decrease the current through the external load.

By using the independent rise and fall waveform shaping equalization approach, embodiments can compensate for asymmetry distortions and equalize the system in order to improve system performance.

EXAMPLES

Figure 6:
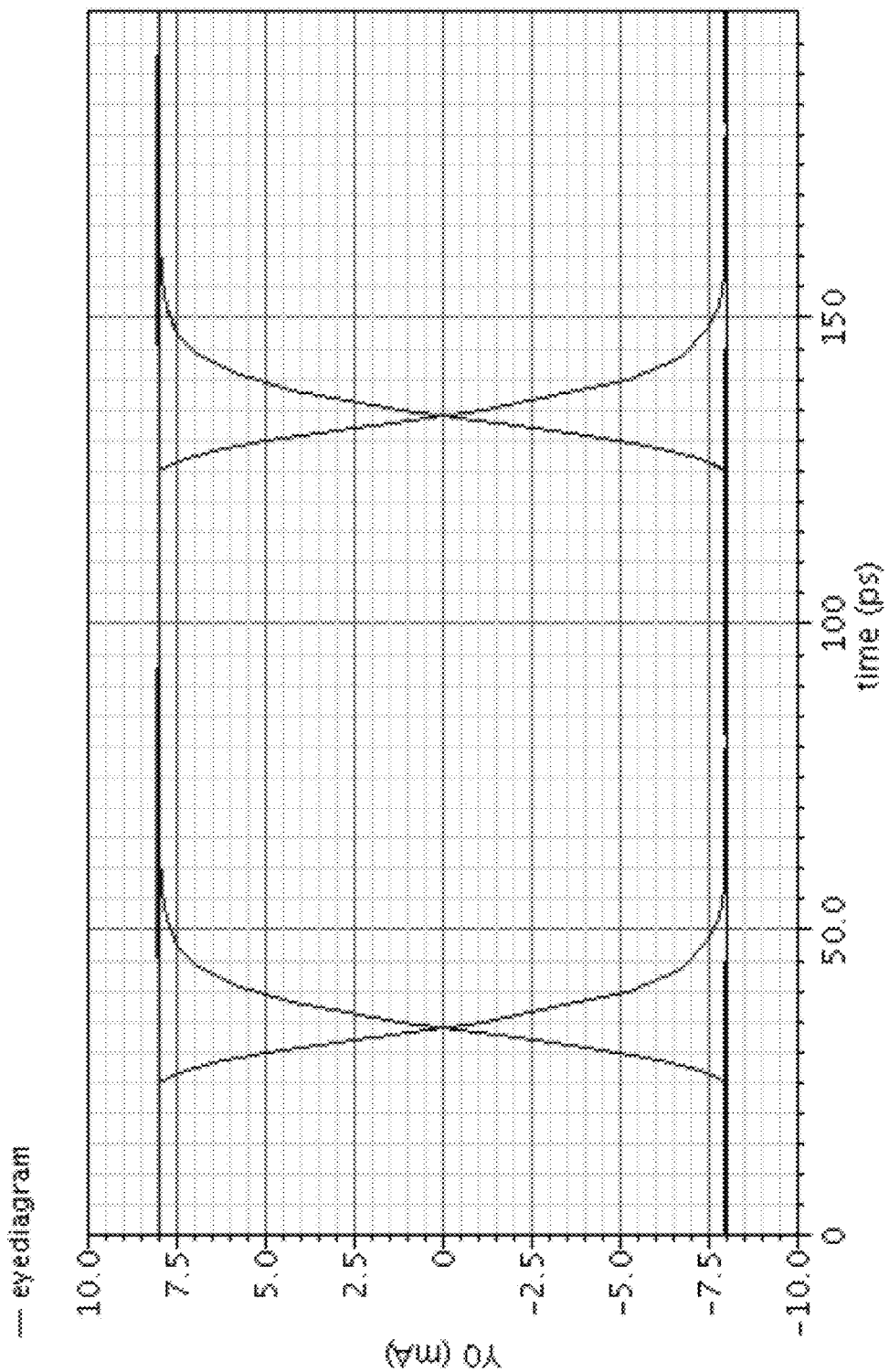
FIGS. 6-15 are example waveforms.

The following FIGS. 6-15 are example waveforms generated from the above equalization circuits. These figures illustrate the flexibility of this equalization technique in shaping the waveforms. In particular FIG. 6 is an eye diagram showing the waveform without equalization.

Figure 7:
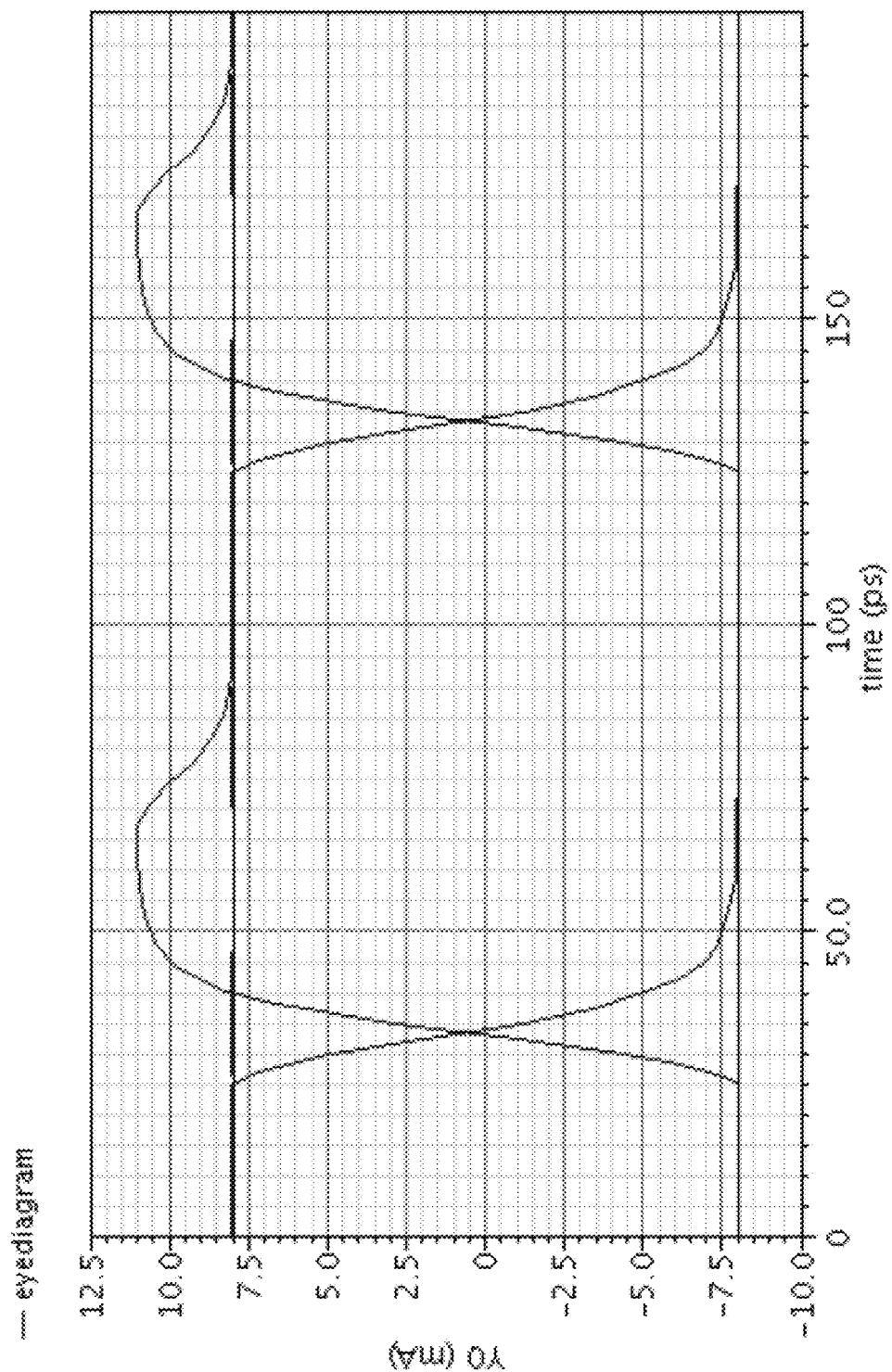
Figure 8:
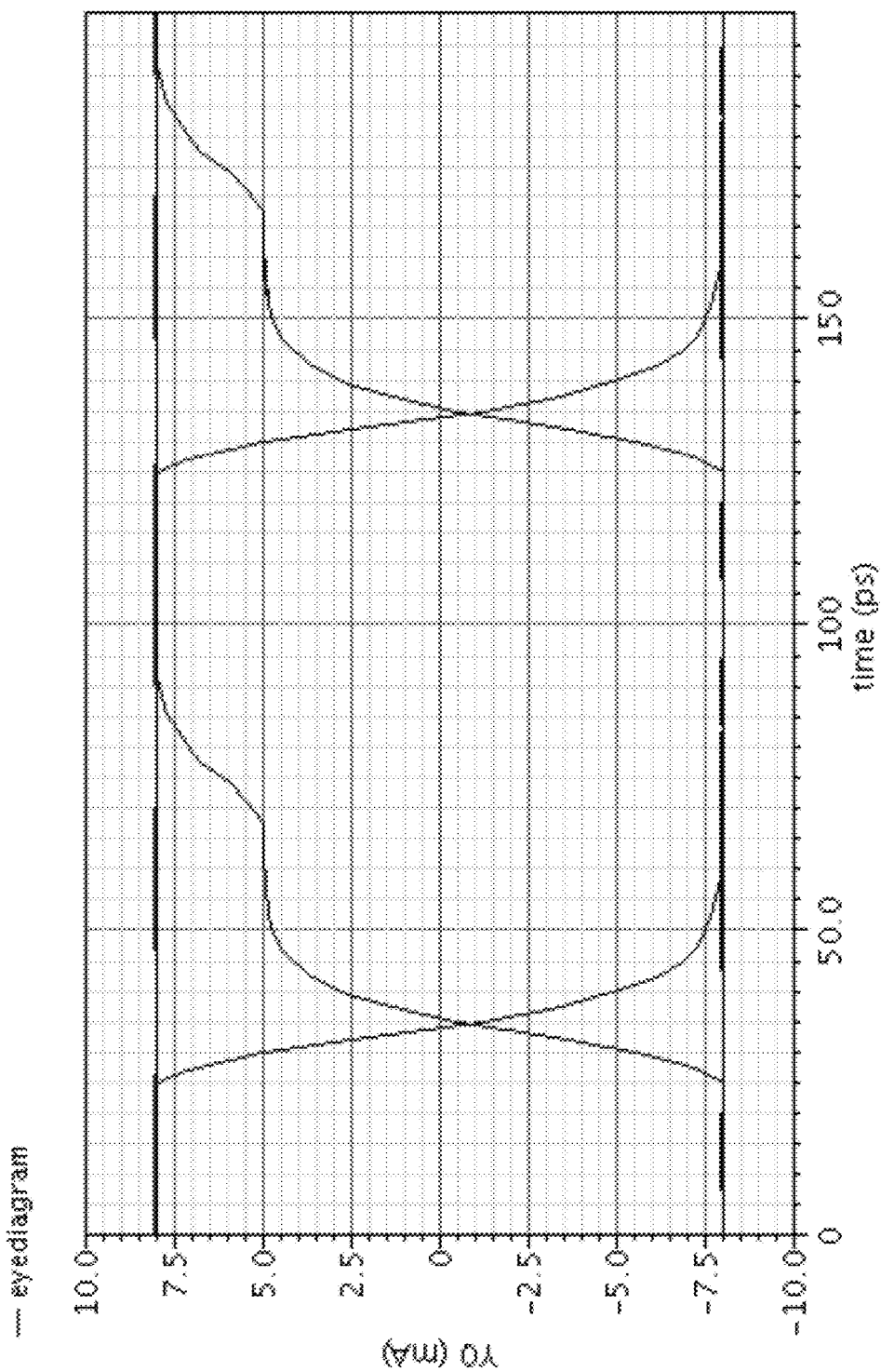

FIG. 7 is an eye diagram showing the rising edge of the waveform peaking. FIG. 8 is an eye diagram showing reduction in the rising edge of the waveform utilizing independent equalization according to an embodiment.

Figure 9:
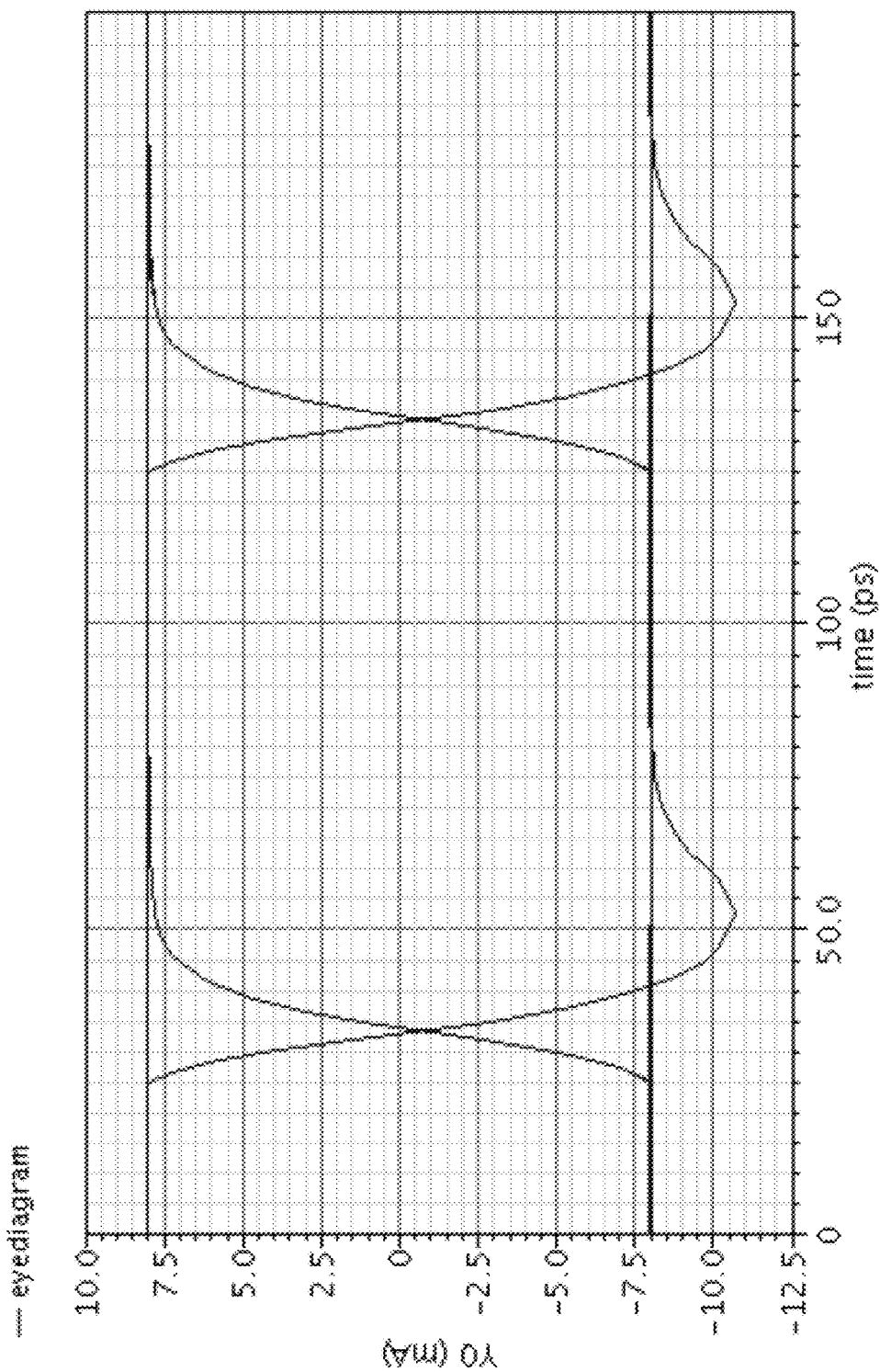
Figure 10:
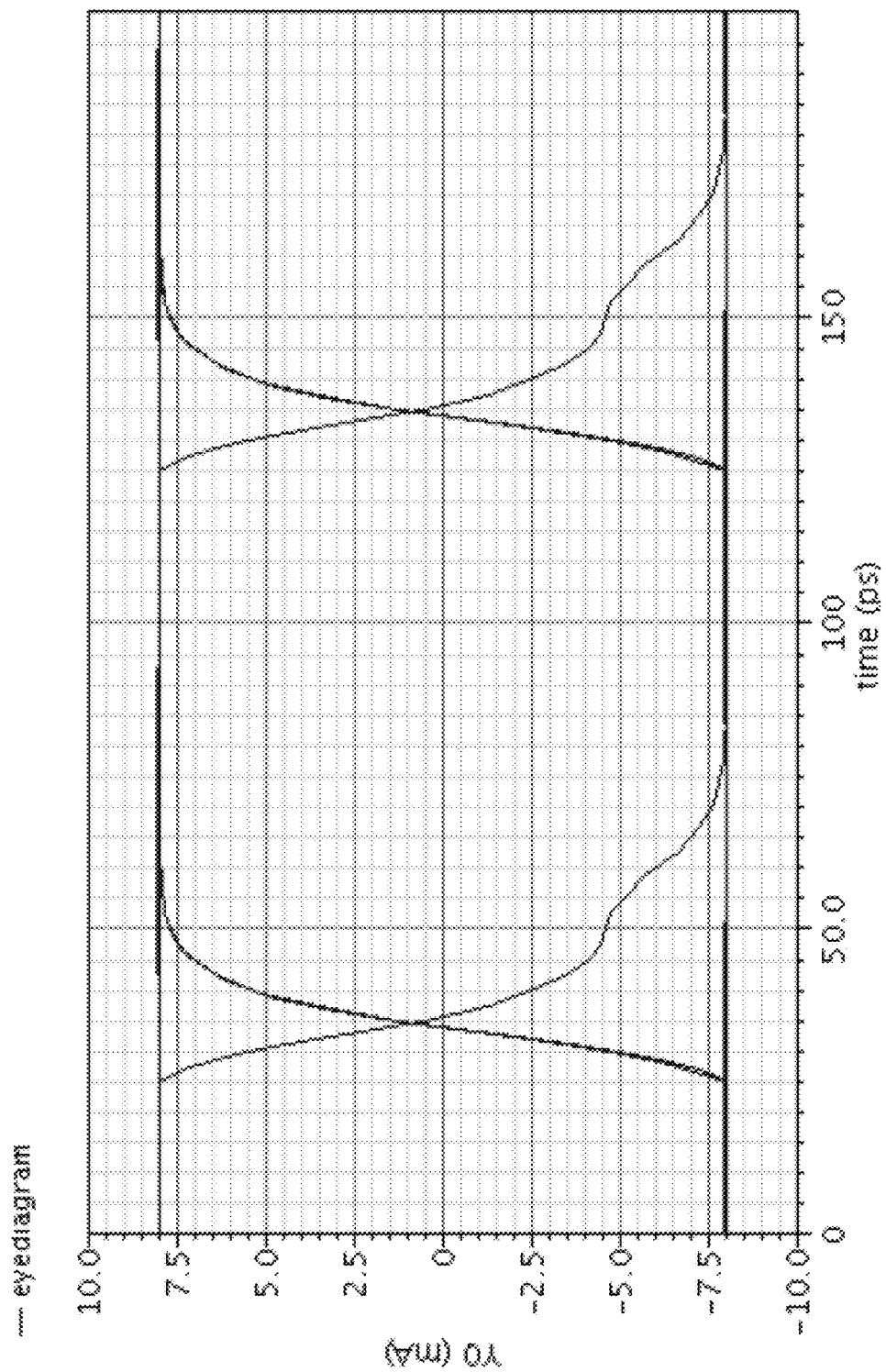

FIG. 9 is an eye diagram showing the falling edge of the waveform peaking. FIG. 10 is an eye diagram with reduction in the falling edge of the waveform utilizing independent equalization according to an embodiment.

Figure 11:
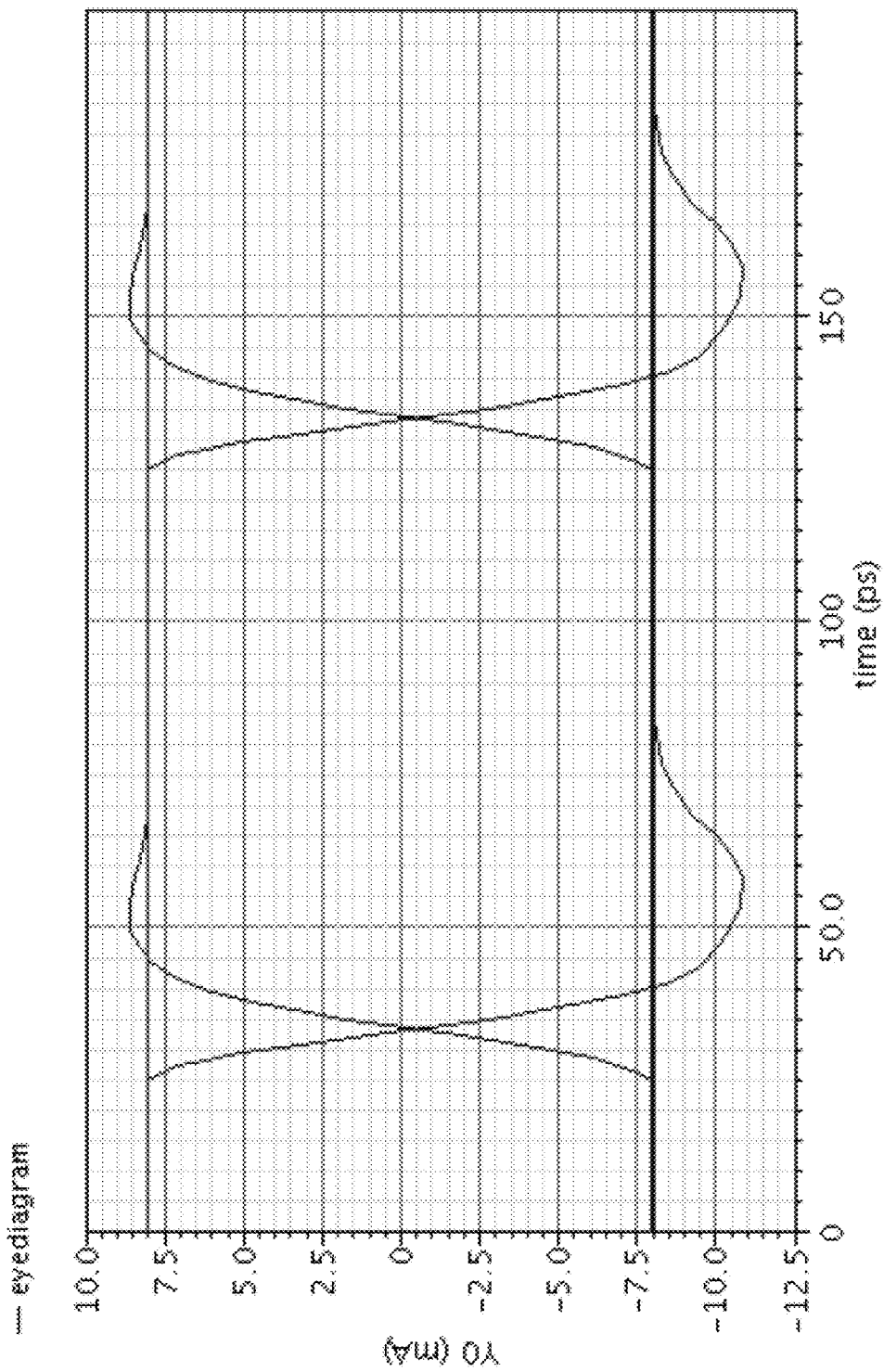

FIG. 11 is an eye diagram with the different rising edge and falling edge peaking.

Figure 12:
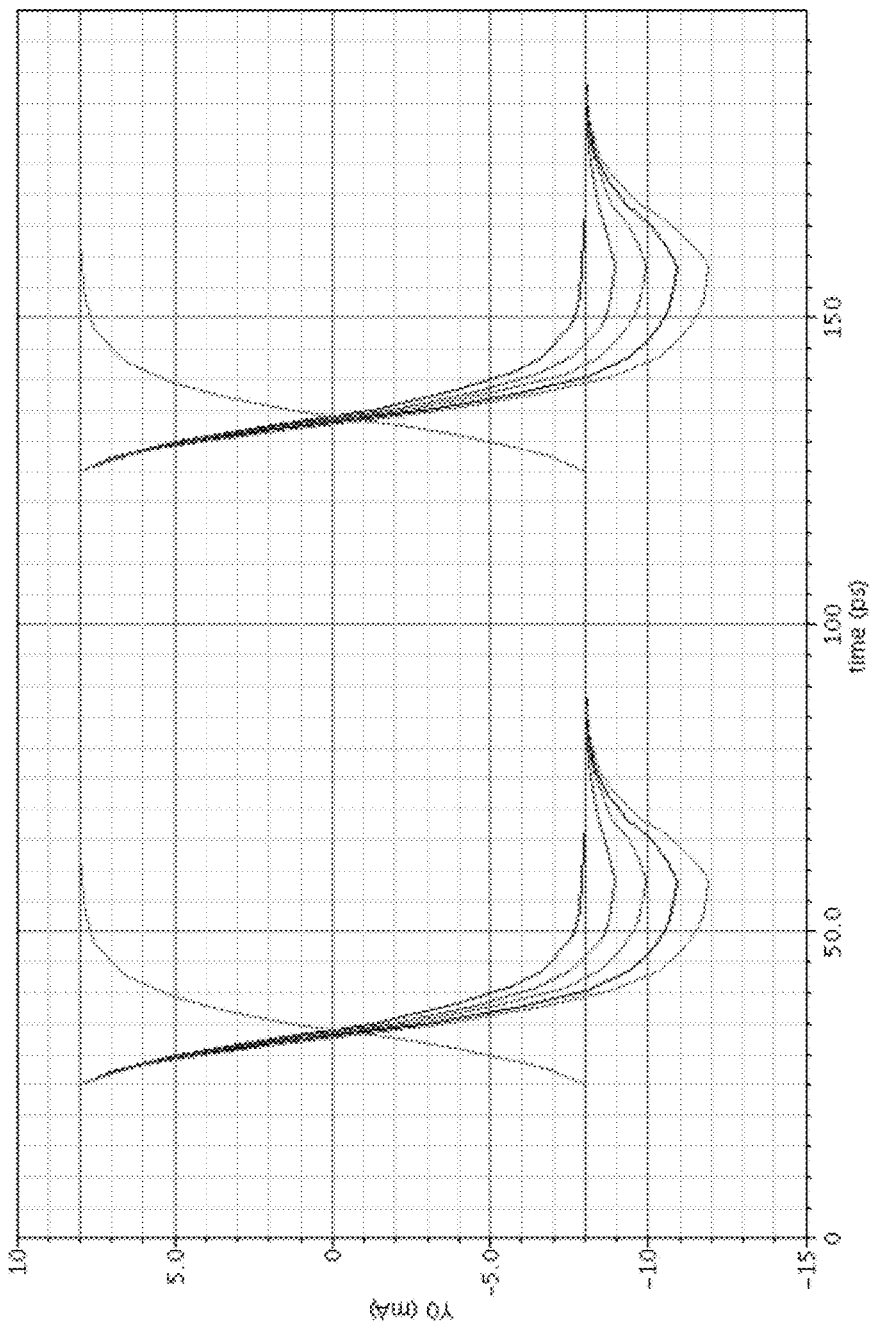
Figure 13:
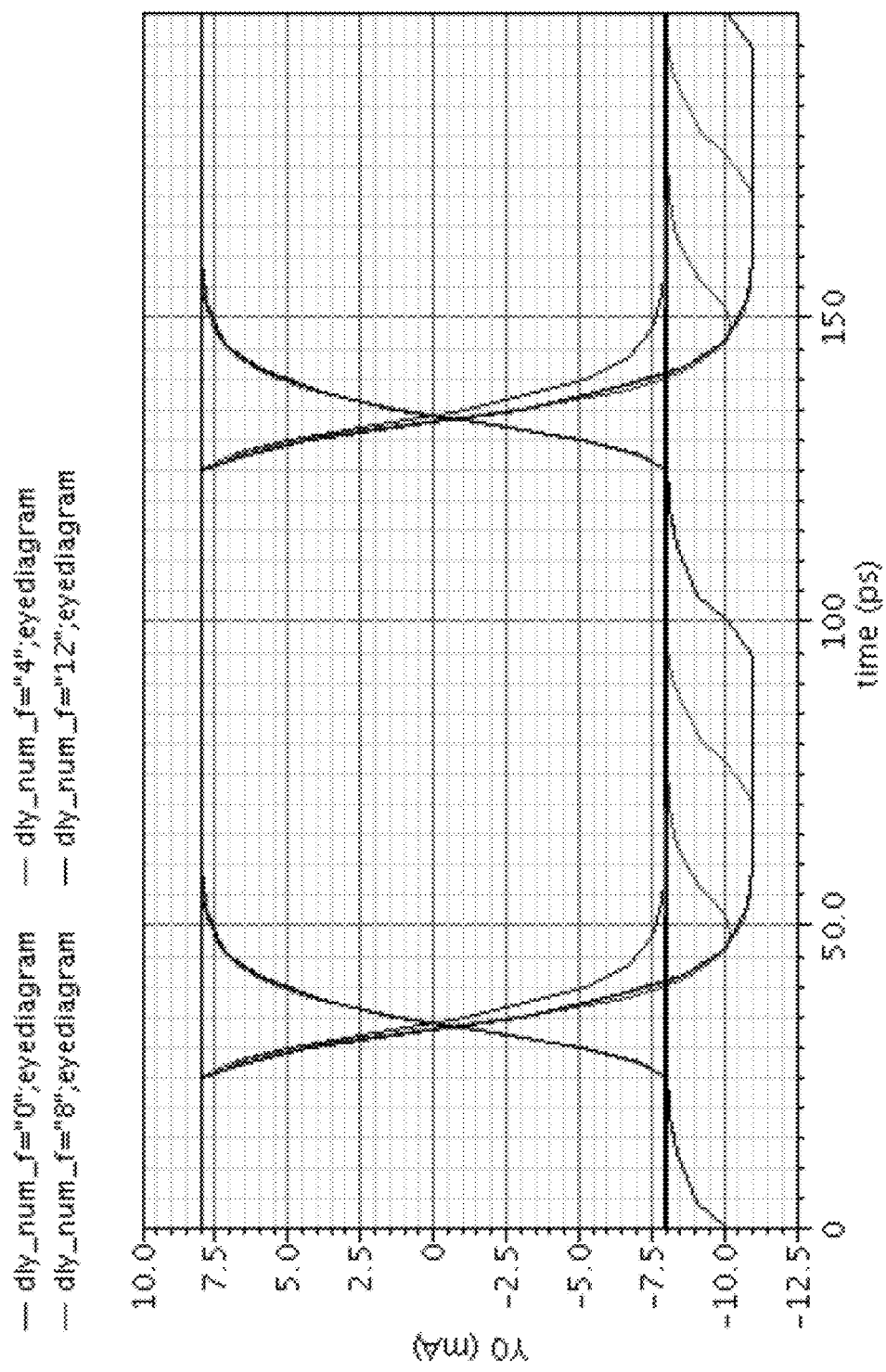

FIG. 12 is an eye diagram with different falling edge peaking amplitudes. FIG. 13 is an eye diagram with different falling edge peaking durations.

Figure 14:
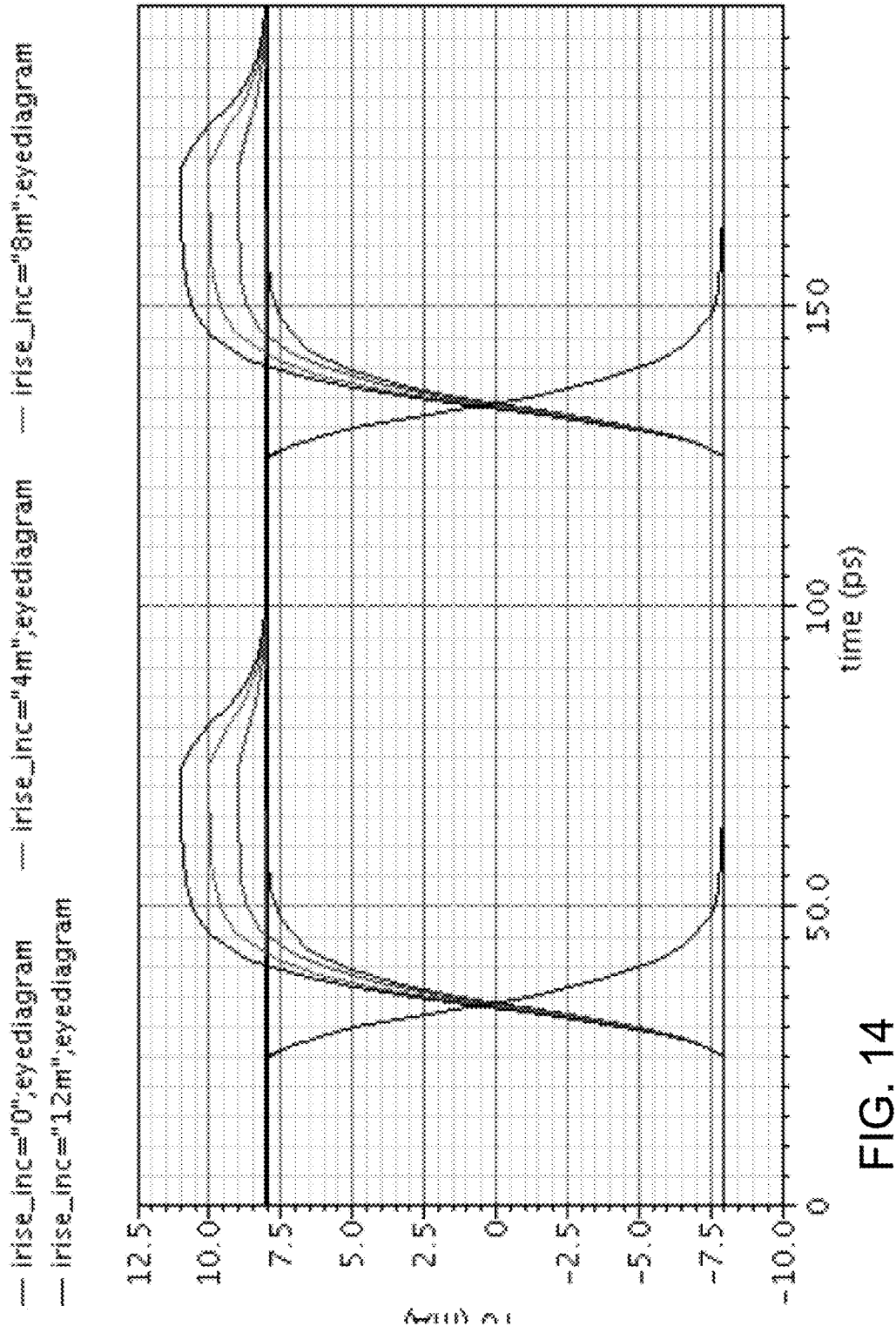
Figure 15:
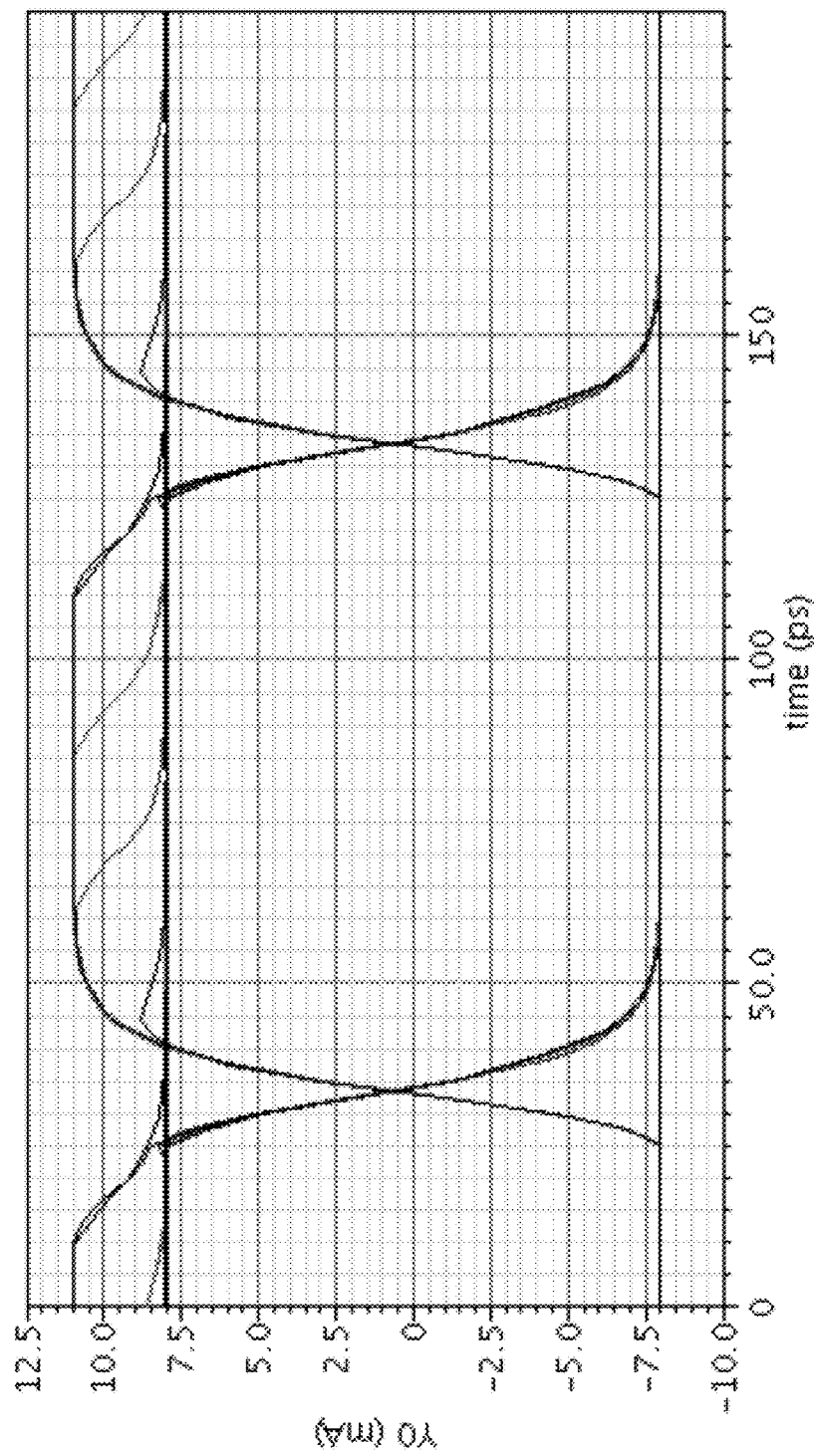

FIG. 14 is an eye diagram with different rising edge peaking amplitudes. FIG. 15 is an eye diagram with different rising edge peaking durations.

Figure 16:
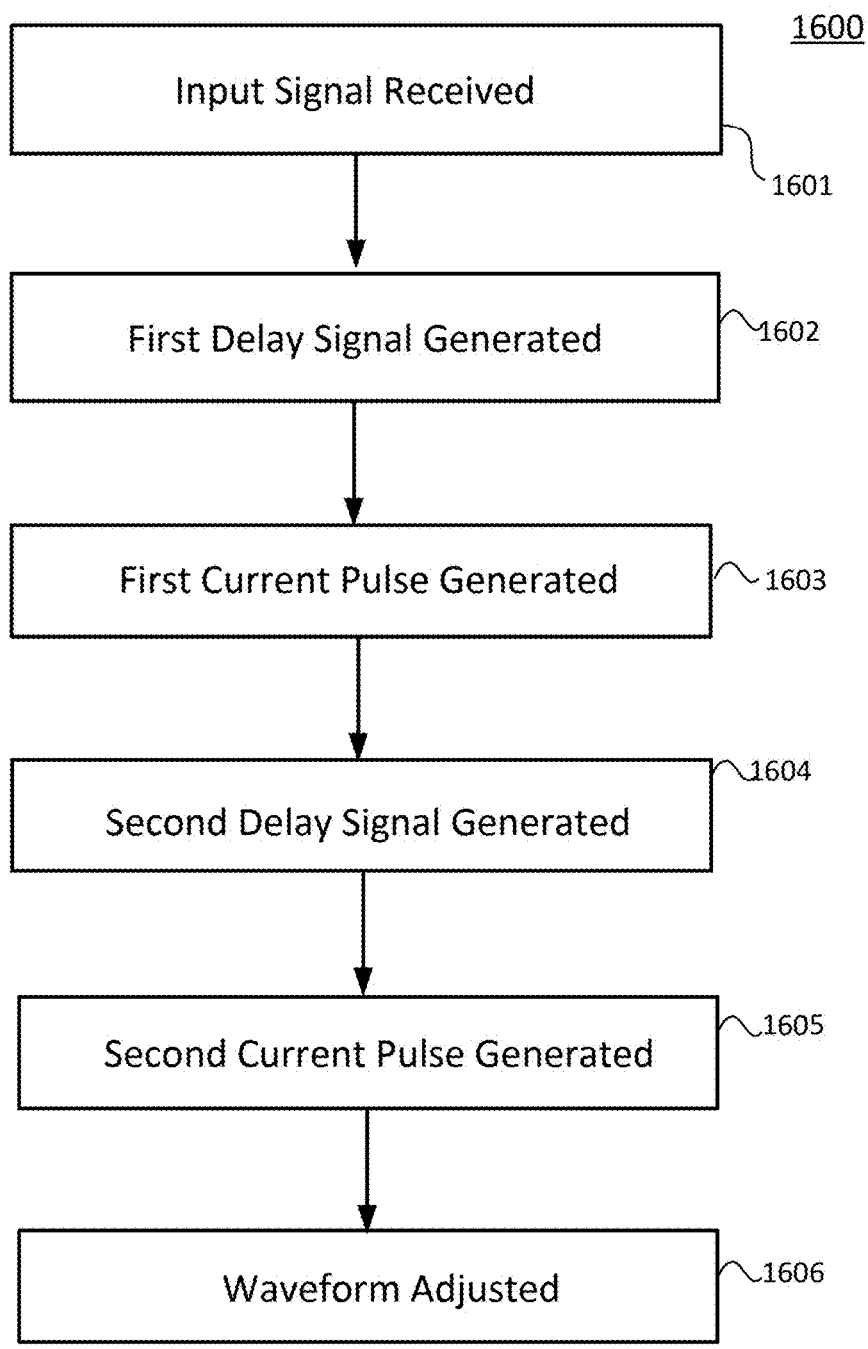
FIG. 16 is a simplified view of process flow according to an embodiment.

FIG. 16 is a simplified flow diagram illustrating a process 1600 for waveform shaping according to an embodiment. This diagram is merely an example, which should not unduly limit the scope of the claims. One of ordinary skill in the art would recognize many variations, alternatives, and modifications. For example, one or more steps may be added, removed, replaced, repeated, modified, rearranged, and/or repeated.

At step 1601, an input signal is received.

At step 1602, a first delay signal is generated from a rising edge transition of the input signal.

At step 1603, a first current pulse signal is generated from the input signal and the first delay signal.

At step 1604, a second delay signal is generated from a falling edge transition of the input signal.

At step 1605, a second current pulse signal is generated from the input signal and the second delay signal.

At step 1606, the input signal, the first current pulse signal, and the second current pulse signal are combined to produce an output having a waveform adjusted for the rising edge transition or the falling edge transition.

It is to be appreciated that by using independent rise and fall waveform shaping equalization according to embodiment, a reduction in BER is possible. There are other benefits as well.

While the above is a full description of the specific embodiments, various modifications, alternative constructions and equivalents may be used. Therefore, the above description and illustrations should not be taken as limiting the scope of the present invention which is defined by the appended claims.

What is claimed is:

1. An apparatus comprising:
a main driver configured to generate a main driver current from an input signal;
a first adjustable delay block configured to generate a first delay signal from the input signal;
a rising-edge equalization driver configured to generate from the delay signal and the input signal, a first corresponding current pulse reflecting a rising edge transition in the input signal;
a second adjustable delay block configured to generate a second delay signal from the input signal;
a falling-edge equalization driver configured to generate from the delay signal and the input signal, a second corresponding current pulse reflecting a falling edge transition in the input signal; and
a final driver configured to combine the main driver current with the first corresponding current pulse and the second corresponding current pulse to generate an output having a waveform adjusted for the rising edge transition or the falling edge transition, wherein:
the rising-edge equalization driver is configured to generate a positive current pulse when there is a rising edge in the input signal;
the falling-edge equalization driver is configured to generate positive current pulse when there is a falling edge in the input signal; and the apparatus further comprises,
a second rising-edge equalization driver configured to generate a negative current pulse when there is a rising edge in the input signal;
a second falling-edge equalization driver configured to generate negative current pulse when there is a falling edge in the input signal.

2. An apparatus as in claim 1 wherein the first delay block comprises a chain of delay cells in communication with a multiple-phase mixer configured to produce the corresponding current pulse.

3. An apparatus as in claim 2 wherein a delay cell of the delay cell chain comprises a buffer.

4. An apparatus as in claim 3 wherein the buffer is in current mode logic (CML), CMOS, or emitter-couple logic (ECL).

5. An apparatus as in claim 2 wherein a delay cell of the delay cell chain is regulated in a loop.

6. An apparatus as in claim 5 wherein the loop is a delay-locked loop.

7. An apparatus as in claim 5 wherein the loop is a phase-locked loop.

8. An apparatus as in claim 1 wherein:
the first delay signal comprises a delay of the input signal; and
the second delay signal comprises a delay of an inverse of the input signal.

9. An apparatus as in claim 1 wherein the combiner comprises a transistor biased at a base of a DC voltage comprising a common mode voltage of the input signal.

10. An apparatus as in claim 1 wherein the input signal is received from a photo detector.

11. An apparatus as in claim 1 wherein the final driver comprises:
a first output transistor having a first node coupled to the rising-edge equalization driver and the falling edge equalization driver; and
a second output transistor having a second node coupled to the second rising-edge equalization driver and the second falling-edge equalization driver.

12. A method comprising:
generating, using a main driver, a main driver current from an input signal;
generating, using a first adjustable delay block, a first delay signal from a rising edge of the input signal;
generating, using a second adjustable delay block, a second delay signal from a falling edge of the input signal;
generating, using a first equalization driver, a first current pulse from the input signal and the first delay signal;
generating, using a second equalization driver, a second current pulse from the input signal the second delay signal;
combining, using a final driver, the main driver current, the first current pulse, and the second current pulse to produce an output having a waveform adjusted for the rising edge transition or the falling edge transition, wherein:
the first current pulse is positive; and
the second current pulse is positive; and the method further comprises, generating a negative third current pulse from a rising edge of the input signal; and
generating a negative fourth current pulse from a falling edge of the input signal.

13. A method as in claim 12 wherein the first delay signal is generated from a multiple-phase mixer in communication with a delay cell chain.

14. A method as in claim 13 wherein a delay cell of the delay cell chain comprises a buffer.

15. A method as in claim 14 wherein the buffer is in current mode logic (CML), CMOS, or emitter-couple logic (ECL).

16. A method as in claim 13 comprising regulating a delay cell of the delay cell chain in a loop.

17. A method as in claim 16 wherein the loop is a delay-locked loop.

18. A method as in claim 16 wherein the loop is a phase-locked loop.

19. A method as in claim 12 wherein:
the first delay signal comprises a delay of the input signal; and
the second delay signal comprises a delay of an inverse of the input signal.

20. A method as in claim 12 wherein the combining comprises biasing a transistor at a base of a DC voltage comprising a common mode voltage of the input signal.

21. A method as in claim 12 wherein the input signal is received from a photo detector.

22. A method as in claim 12 wherein the first and second current pulse are communicated to a first node of a first output transistor, and the third and fourth current pulse are communicated to a second node of a second output transistor.

* * * * *